(12) United States Patent
Piemonte et al.

(10) Patent No.: US 9,756,172 B2
(45) Date of Patent: Sep. 5, 2017

(54) METHODS AND APPARATUS FOR DETERMINING ENVIRONMENTAL FACTORS TO MODIFY HARDWARE OR SYSTEM OPERATION

(75) Inventors: Patrick S. Piemonte, San Francisco, CA (US); Billy P. Chen, Santa Clara, CA (US); Christopher Blumenberg, San Francisco, CA (US)

(73) Assignee: Apple Inc., Cupertino, CA (US)

( * ) Notice: Subject to any disclaimer, the term of this patent is extended or adjusted under 35 U.S.C. 154(b) by 477 days.

(21) Appl. No.: 13/594,660

(22) Filed: Aug. 24, 2012

(65) Prior Publication Data
US 2013/0324098 A1  Dec. 5, 2013

Related U.S. Application Data

(60) Provisional application No. 61/655,782, filed on Jun. 5, 2012.

(51) Int. Cl.
| | | |
|---|---|---|
| *H04M 1/725* | (2006.01) | |
| *H04M 1/73* | (2006.01) | |
| *H04W 4/04* | (2009.01) | |
| *H04W 16/22* | (2009.01) | |

(52) U.S. Cl.
CPC ... *H04M 1/72572* (2013.01); *H04M 1/72563* (2013.01); *H04M 1/72569* (2013.01); *H04M 1/73* (2013.01); *H04W 4/043* (2013.01); *H04W 16/22* (2013.01)

(58) Field of Classification Search
CPC ....... H04W 4/02; H04W 4/027; H04W 4/021; H04W 88/02; H04W 52/02; H04M 1/72563; H04M 1/72522; H04M 1/72572; H04M 1/72577; H04M 1/72569; H04M 2250/12

USPC ..... 455/456.1, 456.2, 456.3, 456.4, 418–419
See application file for complete search history.

(56) References Cited

U.S. PATENT DOCUMENTS

| | | | | |
|---|---|---|---|---|
| 5,448,773 A | * | 9/1995 | McBurney et al. | 455/343.6 |
| 6,108,602 A | | 8/2000 | Bairamis | |
| 8,131,312 B2 | * | 3/2012 | Levin | H04B 17/391 342/174 |

(Continued)

FOREIGN PATENT DOCUMENTS

PL  WO 2011095226 A1 * 8/2011 ............. G06T 17/05

OTHER PUBLICATIONS

Arne Schilling, et al., "Generation of VRML City Models for Focus Based Tour Animations", 2003.*

(Continued)

*Primary Examiner* — Magdi Elhag
(74) *Attorney, Agent, or Firm* — Robert C. Kowert; Meyertons, Hood, Kivlin, Kowert & Goetzel, P.C.

(57) ABSTRACT

Methods and apparatus for an environment analysis tool on a mobile device which may construct a model of the surrounding environment in order to determine whether or not characteristics of the model implicate a degradation in wireless signal quality. In response to an analysis of the constructed model to determine signal quality, the environment analysis tool may alter the behavior of any number of hardware or software functions to avoid or reduce efforts to receive or use the affected signal over the duration of the mobile device's presence within the environment with the signal-degrading characteristics.

24 Claims, 14 Drawing Sheets

(56) References Cited

U.S. PATENT DOCUMENTS

| | | | |
|---|---|---|---|
| 8,560,237 B2 | 10/2013 | Rudow et al. | |
| 8,594,706 B1* | 11/2013 | Heinen | H04W 4/02 455/414.1 |
| 2006/0089793 A1 | 4/2006 | Rudow et al. | |
| 2008/0004037 A1 | 1/2008 | Achlioptas et al. | |
| 2008/0059061 A1* | 3/2008 | Lee | 701/209 |
| 2009/0058719 A1 | 3/2009 | Huang et al. | |
| 2009/0177383 A1* | 7/2009 | Tertoolen | 701/208 |
| 2010/0082515 A1 | 4/2010 | Relyea et al. | |
| 2010/0279616 A1* | 11/2010 | Jin et al. | 455/62 |
| 2011/0037649 A1* | 2/2011 | Rao | G01S 19/21 342/357.59 |
| 2011/0071759 A1* | 3/2011 | Pande et al. | 701/213 |
| 2011/0269476 A1 | 11/2011 | Kumar | |
| 2011/0269481 A1* | 11/2011 | Halfmann | H04W 64/00 455/456.1 |
| 2012/0009890 A1 | 1/2012 | Curcio et al. | |
| 2012/0315918 A1 | 12/2012 | Kadous | |
| 2013/0035110 A1 | 2/2013 | Sridhara et al. | |

OTHER PUBLICATIONS

Kada et al., "3D Building Reconstruction From LiDAR Based on a Cell Decomposition Approach", 2009.*

LizardTech, "LiDAR Compressor—Compression to the MrSID Format for LiDAR Data", 2010.*

Rau, et al., "LOD Generation for 3D Polyhedral Building Model", 2006.*

Neteler, "Extrude 2D Polygons to 3D", Dec. 30, 2011.*

NATO Science and Technology Organization, Justin G. Hollands & Nada Ivanovic, Task Switching with 2D and 3D Displays of Geographic Terrain: The Role of Visual Momentum, p. 19-6, Sep. 10, 2002, published in RTO-MP-105.

Springer, Antti Nurminen & Antti Oulasvirta, Designing Interactions for Navigation in 3D Mobile Maps, pp. 198-224, Winter 2008, published in Map-based Mobile Services: Design, Interaction and Usability.

* cited by examiner

METHODS AND APPARATUS FOR DETERMINING ENVIRONMENTAL FACTORS TO MODIFY HARDWARE OR SYSTEM OPERATION

This application claims benefit of priority to U.S. Provisional Application Ser. No. 61/655,782, entitled "Methods and Apparatus for Determining Environmental Factors to Modify Hardware or System Operation," filed Jun. 5, 2012.

BACKGROUND

The performance of various software or hardware functions on a mobile device may depend on characteristics of the surrounding environment. Specifically, when a mobile device has functionality that depends on wireless communication, the wireless reception and transmission efforts of the mobile device may become less efficient or may become fruitless due to interference with a given wireless signal. For example, areas with a dense amount of tall buildings may be characterized as urban canyons, which may impede, among other signals, GPS signals. In such a case, any attempts by the mobile device to search for a GPS signal while the mobile device is in the urban canyon may be a waste of processing cycles or battery power.

SUMMARY

In one embodiment, a mobile device may construct a model of the surrounding environment in order to determine whether or not one or more characteristics of the model implicate a degradation in wireless signal quality. In response to an analysis of the constructed model to determine possible effects on signal quality, the mobile device may alter the behavior of any number of hardware or software functions to avoid or reduce efforts to receive or use the affected signal over the duration of the mobile device's presence within the environment with the signal-degrading characteristics.

Figure 1A:
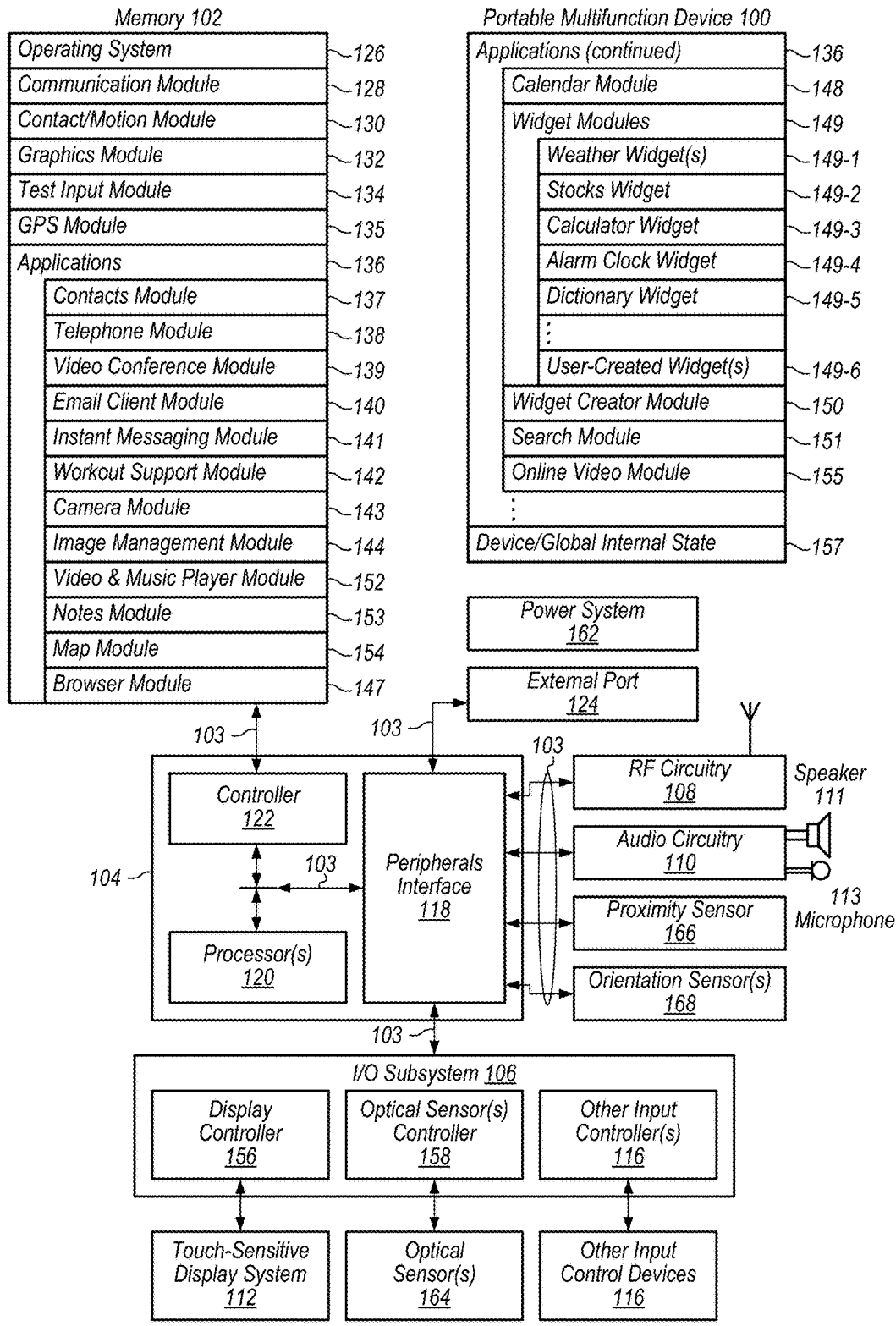
FIG. 1A is an illustration of a mobile device suitable to implement an environment analysis tool, according to some embodiments.

While the invention is described herein by way of example for several embodiments and illustrative drawings, those skilled in the art will recognize that the invention is not limited to the embodiments or drawings described. It should be understood that the drawings and detailed description are not intended to limit the invention to the particular forms disclosed, but on the contrary, the intention is to cover all modifications, equivalents and alternatives falling within the spirit and scope of the present invention. The headings used are for organizational purposes only and are not meant to be used to limit the scope of the description. As used throughout this application, the word "may" is used in a permissive sense (meaning "having the potential to"), rather than the mandatory sense (meaning "must"). Similarly, the words "include", "including", and "includes" mean "including, but not limited to."

DETAILED DESCRIPTION OF EMBODIMENTS

Various embodiments are presented of an environment analysis tool on a mobile device which may determine when, how, or for how long the mobile device alters functionality related to signal search or signal use based on the mobile device's presence within an environment which may degrade signal quality used by the mobile device.

In some cases, a mobile device may have access to information regarding the surrounding environment, including structures, terrain, or heat maps depicting signal strength. The information regarding the surrounding environment may be determined from received mapping information, where the mapping information may include information on terrain, and locations, shapes, and dimensions of surrounding objects. The information regarding the surrounding environment may also be determined from heat maps which may provide information on specific locations or areas where a given signal may be poorly received or not at all received.

In some cases, an environment analysis tool on a mobile device, given mapping information for the surrounding environment, may construct a model representing the surrounding environment. The model may be constructed in a variety of ways. From the model, the mobile device may identify heights of surrounding buildings and identify an arrangement of those buildings that may be an urban canyon where various types of signals may be degraded or absent. In response, the environment analysis tool may cause the mobile device to less aggressively use or cease using or searching for a GPS signal until the urban canyon has been exited. In other cases, the environment analysis tool may cause the mobile device to power down the GPS circuitry or transition the GPS circuitry to a low-power state until the urban canyon has been exited. Without GPS data to determine a location, the environment analysis tool may rely on other sensors to determine location and to determine when the urban canyon has been exited. For example, the environment analysis tool may rely on a combination of a compass, gyroscope or accelerometer within the mobile device to determine a location. In other examples, the environment analysis tool may use Wi-Fi hotspots to provide information regarding location. In other example, the environment analysis tool may triangulate a location based on cell phone towers until an urban canyon is exited.

In some cases, the environment analysis tool may adjust hardware or software functionality based on determining a degradation of various types of signals, including GPS, Wi-Fi, or cellular signals. However, the environment analysis tool may equally be applied to adjust hardware or software functionality on other types of mobile device signals that may be affected by characteristics of the surrounding environment.

As noted above, in some cases the environment analysis tool may determine the loss or impending loss of a given signal, and in response cause the mobile device to change the mode or frequency in which the given signal is used or searched for. In some cases, the environment analysis tool, in response to determining the loss or impending loss of a given signal, may instruct the mobile device to use alternate frequencies. In some cases, the environment analysis tool may instruct the mobile device to enter a passive search mode or a low-power mode or to power down the circuitry or components associated with searching for or processing the signal. The affected components on the mobile device may be software components, hardware components, or both.

In some cases, the environment analysis tool may calculate tradeoffs before determining a response. For example, if based on the current user/mobile device trajectory, the environment analysis tool determines that a signal may only be lost or degraded for a few minutes, and that the resulting power savings in changing modes related to using/detecting the degraded signal would be miniscule, the environment analysis tool may elect to not alter any mode settings. In other cases, the environment analysis tool may, based on the length of time in which the mobile device is to be in an area with a degraded signal, determine to enter a low-power mode instead of powering down components corresponding the signal. These environment analysis tool determinations may also be based on the amount of signal degradation that is calculated to be expected. In other words, if the signal degradation is determined to be small, the environment analysis tool may elect to not make any mode or processing changes within the mobile device.

Regarding determinations of impending signal loss or degradation, the environment analysis tool may rely on various methods. As noted above, the environment analysis tool may receive mapping information from which a model of the surrounding environment is constructed. The model may be constructed in multiple ways. For example, the environment analysis tool may use three-dimensional mapping information of a surrounding area in conjunction with two-dimensional information for the surrounding area, where the two-dimensional information includes building footprints and the three-dimensional information includes height information for one or more points within a given building footprint. In this way, the environment analysis tool may construct a quick three-dimensional model of the surrounding environment based on mapping information that includes vector graphics data instead of (or in addition to) raster data.

In other cases, the environment analysis tool may simply use three-dimensional mapping information to construct a three-dimensional model of the surrounding environment. For example, the environment analysis tool may create a two-dimensional representation of a region of the surrounding environment, where the two-dimensional representation is divided into multiple segments. In this example, the environment analysis tool may use three-dimensional mapping information to correlate a height value for an object in the three-dimensional mapping information with each of the segments in the two-dimensional representation of the region. In this way, each of the two-dimensional segments may be modified to include a height value, thereby producing a rough three-dimensional model of the surrounding environment.

In an embodiment, three-dimensional data may be three-dimensional mesh data, which may contain data defining the location and orientation of thousands of triangles for a given map view. Further in this embodiment, two-dimensional data may be obtained from maps for a given city or county which define the locations and the dimensions of footprints for structures, roads, sidewalks, plazas, or other objects. In this embodiment, in the interest of speed and computational complexity, a three-dimensional proxy may be constructed through the transformation of the two-dimensional model into a three-dimensional model using selected pieces of information from the three-dimensional model to enhance the two-dimensional model. For example, if the two-dimensional model provides information regarding the footprint of a given building, the environment analysis tool may then reference the three-dimensional model to identify the corresponding location of the footprint of the building. Once the location of the footprint of the building is determined in the three-dimensional model, one or more height values may be extracted from the three-dimensional model for the building. Now, given the footprint of the building and the one or more height values, a rough box or polygon may be extruded to one of the height values, or to some value derived from the height values in order to generate an approximate three-dimensional shape. This process may be repeated for each object in the two-dimensional data, thereby creating a rough, low-resolution version of the surrounding environment.

Other response to the environment analysis tool determining that a mobile device has entered or is about to enter a region with an absent or degraded signal is to prefetch information that may not be available while the mobile device is in the region of the degraded/absent signal. For example, in some cases, a mobile device may provide a user with a mapping application that may include a navigation view. To generate the navigation view, the mapping application may rely on mapping information received along a signal that is expected to be degraded or absent. In this case, the environment analysis tool may prefetch or request the mapping information that may be needed while the mobile device is within the region of the degraded/absent signal. For example, if the environment analysis tool determines that an urban canyon exists for the next two city blocks, then the environment analysis tool may prefetch or request mapping information in order for a mapping application to provide uninterrupted mapping services while the mobile device is within the urban canyon. Similarly, to prevent an interruption in other mobile device services, the environment analysis tool may prefetch other types of information that may not be available while the mobile device is within a region where a particular signal is degraded or absent.

Detailed Description Considerations

In the following detailed description, numerous details are set forth to provide a thorough understanding of the claimed subject matter. However, it will be understood by those skilled in the art that the claimed subject matter may be practiced without these specific details. In other instances, methods, apparatus or systems that would be known by one of ordinary skill have not been described in detail so as not to obscure claimed subject matter.

It will also be understood that, although the terms first, second, etc. may be used herein to describe various elements, these elements should not be limited by these terms. These terms are only used to distinguish one element from another. For example, a first contact could be termed a second contact, and, similarly, a second contact could be termed a first contact, without departing from the scope of the present invention. The first contact and the second contact are both contacts, but they are not the same contact.

Embodiments of electronic devices, user interfaces for such devices, and associated processes for using such devices are described. In some embodiments, the device is a portable communications device, such as a mobile telephone, that also contains other functions, such as PDA and/or music player functions. Exemplary embodiments of mobile devices include, without limitation, the iPhone®, iPod Touch®, and iPad® devices from Apple Inc. of Cupertino, Calif. Other portable electronic devices, such as laptops or tablet computers with touch-sensitive surfaces (e.g., touch screen displays and/or touch pads), may also be used. It should also be understood that, in some embodiments, the device is not a portable communications device, but is a desktop computer with a touch-sensitive surface (e.g., a touch screen display and/or a touch pad). In some embodiments, the device is a gaming computer with orientation sensors (e.g., orientation sensors in a gaming controller).

In the discussion that follows, an electronic device that includes a display and a touch-sensitive surface is described. It should be understood, however, that the electronic device may include one or more other physical user-interface devices, such as a physical keyboard, a mouse and/or a joystick.

The device typically supports a variety of applications, such as one or more of the following: a drawing application, a presentation application, a word processing application, a website creation application, a disk authoring application, a spreadsheet application, a gaming application, a telephone application, a video conferencing application, an e-mail application, an instant messaging application, a workout support application, a photo management application, a digital camera application, a digital video camera application, a web browsing application, a digital music player application, and/or a digital video player application.

The various applications that may be executed on the device may use at least one common physical user-interface device, such as the touch-sensitive surface. One or more functions of the touch-sensitive surface as well as corresponding information displayed on the device may be adjusted and/or varied from one application to the next and/or within a respective application. In this way, a common physical architecture (such as the touch-sensitive surface) of the device may support the variety of applications with user interfaces that are intuitive and transparent to the user.

Some portions of the detailed description which follow are presented in terms of algorithms or symbolic representations of operations on binary digital signals stored within a memory of a specific apparatus or special purpose computing device or platform. In the context of this particular specification, the term specific apparatus or the like includes a general purpose computer once it is programmed to perform particular functions pursuant to instructions from program software. Algorithmic descriptions or symbolic representations are examples of techniques used by those of ordinary skill in the signal processing or related arts to convey the substance of their work to others skilled in the art. An algorithm is here, and is generally, considered to be a self-consistent sequence of operations or similar signal processing leading to a desired result. In this context, operations or processing involve physical manipulation of physical quantities. Typically, although not necessarily, such quantities may take the form of electrical or magnetic signals capable of being stored, transferred, combined, compared or otherwise manipulated. It has proven convenient at times, principally for reasons of common usage, to refer to such signals as bits, data, values, elements, symbols, characters, terms, numbers, numerals or the like. It should be understood, however, that all of these or similar terms are to be associated with appropriate physical quantities and are merely convenient labels. Unless specifically stated otherwise, as apparent from the following discussion, it is appreciated that throughout this specification discussions utilizing terms such as "processing", "computing", "calculating", "determining", or the like refer to actions or processes of a specific apparatus, such as a special purpose computer or a similar special purpose electronic computing device. In the context of this specification, therefore, a special purpose computer or a similar special purpose electronic computing device is capable of manipulating or transforming signals, typically represented as physical electronic or magnetic quantities within memories, registers, or other information storage devices, transmission devices, or display devices of the special purpose computer or similar special purpose electronic computing device.

Example Mobile Device

Attention is now directed toward embodiments of portable devices with touch-sensitive displays. FIG. 1A is a block diagram illustrating portable mobile device 100 with touch-sensitive displays 112 in accordance with some embodiments. Touch-sensitive display 112 is sometimes called a "touch screen" for convenience, and may also be known as or called a touch-sensitive display system. Device 100 may include memory 102 (which may include one or more computer-readable storage mediums, including non-transitory computer-readable storage mediums), memory controller 122, one or more processing units (CPU's) 120, peripherals interface 118, RF circuitry 108, audio circuitry 110, speaker 111, microphone 113, input/output (I/O) subsystem 106, other input or control devices 116, and external port 124. Device 100 may include one or more optical sensors 164. These components may communicate over one or more communication buses or signal lines 103.

It should be appreciated that device 100 is only one example of a portable mobile device, and that device 100 may have more or fewer components than shown, may combine two or more components, or may have a different configuration or arrangement of the components. The various components shown in FIG. 1A may be implemented in hardware, software, or a combination of both hardware and software, including one or more signal processing and/or application specific integrated circuits.

Memory 102 may include high-speed random access memory and may also include non-volatile memory, such as one or more magnetic disk storage devices, flash memory devices, or other non-volatile solid-state memory devices. Access to memory 102 by other components of device 100, such as CPU 120 and the peripherals interface 118, may be controlled by memory controller 122.

Peripherals interface 118 can be used to couple input and output peripherals of the device to CPU 120 and memory 102. The one or more processors 120 run or execute various software programs and/or sets of instructions stored in memory 102 to perform various functions for device 100 and to process data.

In some embodiments, peripherals interface 118, CPU 120, and memory controller 122 may be implemented on a single chip, such as chip 104. In some other embodiments, they may be implemented on separate chips.

RF (radio frequency) circuitry 108 receives and sends RF signals, also called electromagnetic signals. RF circuitry 108 converts electrical signals to/from electromagnetic signals and communicates with communications networks and other communications devices via the electromagnetic signals. RF circuitry 108 may include well-known circuitry for performing these functions, including but not limited to an antenna system, an RF transceiver, one or more amplifiers, a tuner, one or more oscillators, a digital signal processor, a CODEC chipset, a subscriber identity module (SIM) card, memory, and so forth. RF circuitry 108 may communicate with networks, such as the Internet, also referred to as the World Wide Web (WWW), an intranet and/or a wireless network, such as a cellular telephone network, a wireless local area network (LAN) and/or a metropolitan area network (MAN), and other devices by wireless communication. The wireless communication may use any of multiple communications standards, protocols and technologies, including but not limited to Global System for Mobile Communications (GSM), Enhanced Data GSM Environment (EDGE), high-speed downlink packet access (HSDPA), high-speed uplink packet access (HSUPA), wideband code division multiple access (W-CDMA), code division multiple access (CDMA), time division multiple access (TDMA), Bluetooth, Wireless Fidelity (Wi-Fi) (e.g., IEEE 802.11a, IEEE 802.11b, IEEE 802.11g and/or IEEE 802.11n), voice over Internet Protocol (VoIP), Wi-MAX, a protocol for e-mail (e.g., Internet message access protocol (IMAP) and/or post office protocol (POP)), instant messaging (e.g., extensible messaging and presence protocol (XMPP), Session Initiation Protocol for Instant Messaging and Presence Leveraging Extensions (SIMPLE), Instant Messaging and Presence Service (IMPS)), and/or Short Message Service (SMS), or any other suitable communication protocol, including communication protocols not yet developed as of the filing date of this document.

Audio circuitry 110, speaker 111, and microphone 113 provide an audio interface between a user and device 100. Audio circuitry 110 receives audio data from peripherals interface 118, converts the audio data to an electrical signal, and transmits the electrical signal to speaker 111. Speaker 111 converts the electrical signal to human-audible sound waves. Audio circuitry 110 also receives electrical signals converted by microphone 113 from sound waves. Audio circuitry 110 converts the electrical signal to audio data and transmits the audio data to peripherals interface 118 for processing. Audio data may be retrieved from and/or transmitted to memory 102 and/or RF circuitry 108 by peripherals interface 118. In some embodiments, audio circuitry 110 also includes a headset jack (e.g., 212, FIG. 2). The headset jack provides an interface between audio circuitry 110 and removable audio input/output peripherals, such as output-only headphones or a headset with both output (e.g., a headphone for one or both ears) and input (e.g., a microphone).

I/O subsystem 106 couples input/output peripherals on device 100, such as touch screen 112 and other input control devices 116, to peripherals interface 118. I/O subsystem 106 may include display controller 156 and one or more input controllers 160 for other input or control devices. The one or more input controllers 160 receive/send electrical signals from/to other input or control devices 116. The other input control devices 116 may include physical buttons (e.g., push buttons, rocker buttons, etc.), dials, slider switches, joysticks, click wheels, and so forth. In some alternate embodiments, input controller(s) 160 may be coupled to any (or none) of the following: a keyboard, infrared port, USB port, and a pointer device such as a mouse. The one or more buttons (e.g., 208, FIG. 2) may include an up/down button for volume control of speaker 111 and/or microphone 113. The one or more buttons may include a push button (e.g., 206, FIG. 2).

Touch-sensitive display 112 provides an input interface and an output interface between the device and a user. Display controller 156 receives and/or sends electrical signals from/to touch screen 112. Touch screen 112 displays visual output to the user. The visual output may include graphics, text, icons, video, and any combination thereof (collectively termed "graphics"). In some embodiments, some or all of the visual output may correspond to user-interface objects.

Touch screen 112 has a touch-sensitive surface, sensor or set of sensors that accepts input from the user based on haptic and/or tactile contact. Touch screen 112 and display controller 156 (along with any associated modules and/or sets of instructions in memory 102) detect contact (and any movement or breaking of the contact) on touch screen 112 and converts the detected contact into interaction with user-interface objects (e.g., one or more soft keys, icons, web pages or images) that are displayed on touch screen 112. In an exemplary embodiment, a point of contact between touch screen 112 and the user corresponds to a finger of the user.

Touch screen 112 may use LCD (liquid crystal display) technology, LPD (light emitting polymer display) technology, or LED (light emitting diode) technology, although other display technologies may be used in other embodiments. Touch screen 112 and display controller 156 may detect contact and any movement or breaking thereof using any of multiple touch sensing technologies now known or later developed, including but not limited to capacitive, resistive, infrared, and surface acoustic wave technologies, as well as other proximity sensor arrays or other elements for determining one or more points of contact with touch screen 112. In an exemplary embodiment, projected mutual capacitance sensing technology is used, such as that found in the iPhone®, iPod Touch®, and iPad® from Apple Inc. of Cupertino, Calif.

Touch screen 112 may have a video resolution in excess of 100 dpi. In some embodiments, the touch screen has a video resolution of approximately 160 dpi. The user may make contact with touch screen 112 using any suitable object or appendage, such as a stylus, a finger, and so forth. In some embodiments, the user interface is designed to work primarily with finger-based contacts and gestures, which can be less precise than stylus-based input due to the larger area of contact of a finger on the touch screen. In some embodiments, the device translates the rough finger-based input into a precise pointer/cursor position or command for performing the actions desired by the user.

In some embodiments, in addition to the touch screen, device 100 may include a touchpad (not shown) for activating or deactivating particular functions. In some embodiments, the touchpad is a touch-sensitive area of the device that, unlike the touch screen, does not display visual output. The touchpad may be a touch-sensitive surface that is separate from touch screen 112 or an extension of the touch-sensitive surface formed by the touch screen.

Device 100 also includes power system 162 for powering the various components. Power system 162 may include a power management system, one or more power sources (e.g., battery, alternating current (AC)), a recharging system, a power failure detection circuit, a power converter or inverter, a power status indicator (e.g., a light-emitting diode (LED)) and any other components associated with the generation, management and distribution of power in portable devices.

Device 100 may also include one or more optical sensors 164. FIG. 1A shows an optical sensor coupled to optical sensor controller 158 in I/O subsystem 106. Optical sensor 164 may include charge-coupled device (CCD) or complementary metal-oxide semiconductor (CMOS) phototransistors. Optical sensor 164 receives light from the environment, projected through one or more lens, and converts the light to data representing an image. In conjunction with imaging module 143 (also called a camera module), optical sensor 164 may capture still images or video. In some embodiments, an optical sensor is located on the back of device 100, opposite touch screen display 112 on the front of the device, so that the touch screen display may be used as a viewfinder for still and/or video image acquisition. In some embodiments, another optical sensor is located on the front of the device so that the user's image may be obtained for videoconferencing while the user views the other video conference participants on the touch screen display.

Device 100 may also include one or more proximity sensors 166. FIG. 1A shows proximity sensor 166 coupled to peripherals interface 118. Alternately, proximity sensor 166 may be coupled to input controller 160 in I/O subsystem 106. In some embodiments, the proximity sensor turns off and disables touch screen 112 when the mobile device is placed near the user's ear (e.g., when the user is making a phone call).

Device 100 includes one or more orientation sensors 168. In some embodiments, the one or more orientation sensors include one or more accelerometers (e.g., one or more linear accelerometers and/or one or more rotational accelerometers). In some embodiments, the one or more orientation sensors include one or more gyroscopes. In some embodiments, the one or more orientation sensors include one or more magnetometers. In some embodiments, the one or more orientation sensors include one or more of global positioning system (GPS), Global Navigation Satellite System (GLONASS), and/or other global navigation system receivers. The GPS, GLONASS, and/or other global navigation system receivers may be used for obtaining information concerning the location and orientation (e.g., portrait or landscape) of device 100. In some embodiments, the one or more orientation sensors include any combination of orientation/rotation sensors. FIG. 1A shows the one or more orientation sensors 168 coupled to peripherals interface 118. Alternately, the one or more orientation sensors 168 may be coupled to an input controller 160 in I/O subsystem 106. In some embodiments, information is displayed on the touch screen display in a portrait view or a landscape view based on an analysis of data received from the one or more orientation sensors.

Figure 3:
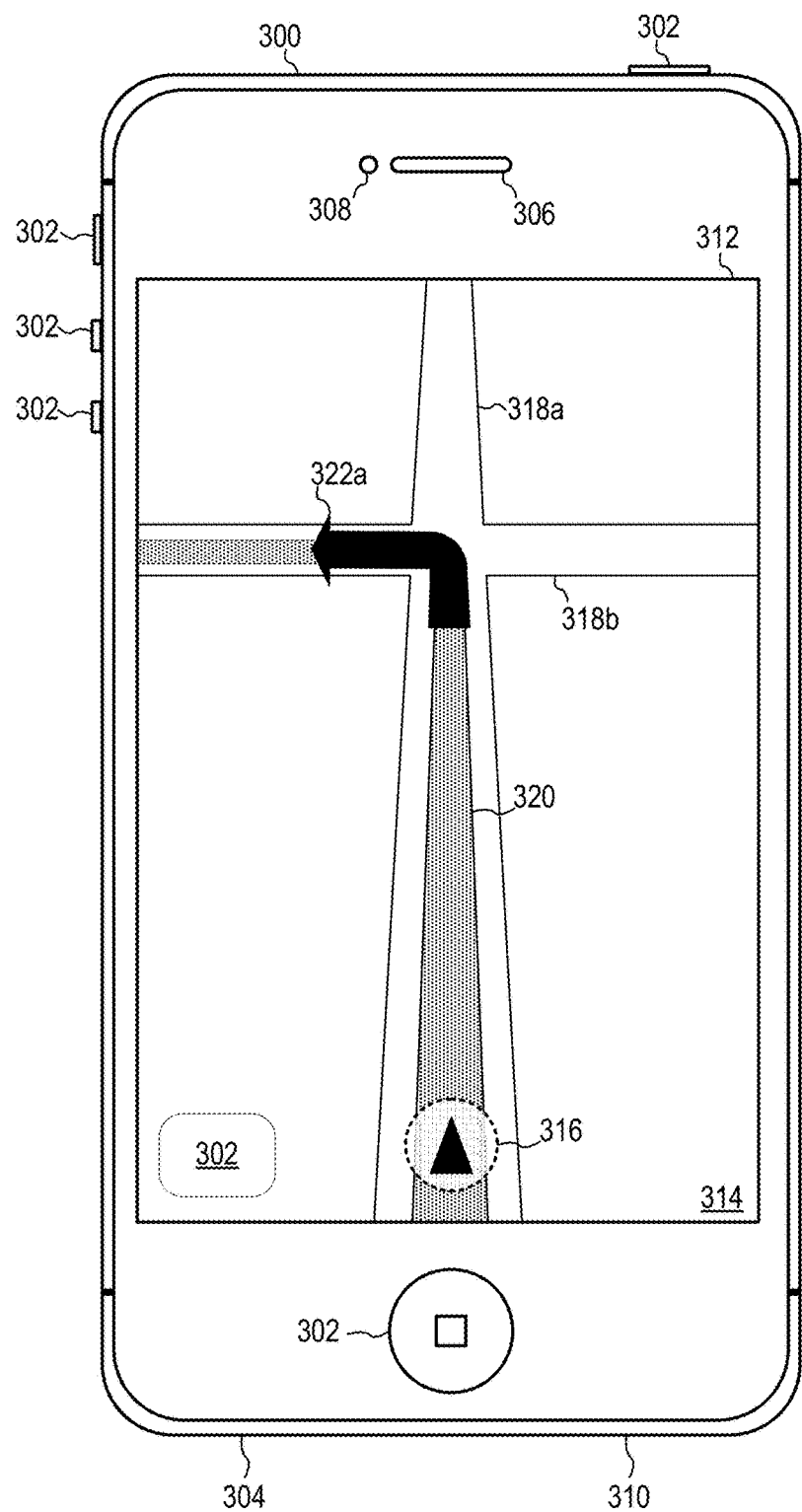
FIG. 3 illustrates another mobile device configurable to implement a mapping application and an environment analysis tool, according to some embodiments.

In some embodiments, the software components stored in memory 102 include operating system 126, communication module (or set of instructions) 128, contact/motion module (or set of instructions) 130, graphics module (or set of instructions) 132, text input module (or set of instructions) 134, Global Positioning System (GPS) module (or set of instructions) 135, and applications (or sets of instructions) 136. Furthermore, in some embodiments memory 102 stores device/global internal state 157, as shown in FIGS. 1A and 3. Device/global internal state 157 includes one or more of: active application state, indicating which applications, if any, are currently active; display state, indicating what applications, views or other information occupy various regions of touch screen display 112; sensor state, including information obtained from the device's various sensors and input control devices 116; and location information concerning the device's location and/or attitude.

Operating system 126 (e.g., Darwin, RTXC, LINUX, UNIX, OS X, WINDOWS, or an embedded operating system such as VxWorks) includes various software components and/or drivers for controlling and managing general system tasks (e.g., memory management, storage device control, power management, etc.) and facilitates communication between various hardware and software components.

Communication module 128 facilitates communication with other devices over one or more external ports 124 and also includes various software components for handling data received by RF circuitry 108 and/or external port 124. External port 124 (e.g., Universal Serial Bus (USB), FIREWIRE, etc.) is adapted for coupling directly to other devices or indirectly over a network (e.g., the Internet, wireless LAN, etc.). In some embodiments, the external port is a multi-pin (e.g., 30-pin) connector that is the same as, or similar to and/or compatible with the 30-pin connector used on iPod (trademark of Apple Inc.) devices.

Contact/motion module 130 may detect contact with touch screen 112 (in conjunction with display controller 156) and other touch sensitive devices (e.g., a touchpad or physical click wheel). Contact/motion module 130 includes various software components for performing various operations related to detection of contact, such as determining if contact has occurred (e.g., detecting a finger-down event), determining if there is movement of the contact and tracking the movement across the touch-sensitive surface (e.g., detecting one or more finger-dragging events), and determining if the contact has ceased (e.g., detecting a finger-up event or a break in contact). Contact/motion module 130 receives contact data from the touch-sensitive surface. Determining movement of the point of contact, which is represented by a series of contact data, may include determining speed (magnitude), velocity (magnitude and direction), and/or an acceleration (a change in magnitude and/or direction) of the point of contact. These operations may be applied to single contacts (e.g., one finger contacts) or to multiple simultaneous contacts (e.g., "multitouch"/multiple finger contacts). In some embodiments, contact/motion module 130 and display controller 156 detect contact on a touchpad.

Contact/motion module 130 may detect a gesture input by a user. Different gestures on the touch-sensitive surface have different contact patterns. Thus, a gesture may be detected by detecting a particular contact pattern. For example, detecting a finger tap gesture includes detecting a finger-down event followed by detecting a finger-up (lift off) event at the same position (or substantially the same position) as the finger-down event (e.g., at the position of an icon). As another example, detecting a finger swipe gesture on the touch-sensitive surface includes detecting a finger-down event followed by detecting one or more finger-dragging events, and subsequently followed by detecting a finger-up (lift off) event.

Graphics module 132 includes various known software components for rendering and displaying graphics on touch screen 112 or other display, including components for changing the intensity of graphics that are displayed. As used herein, the term "graphics" includes any object that can be displayed to a user, including without limitation text, web pages, icons (such as user-interface objects including soft keys), digital images, videos, animations and the like.

In some embodiments, graphics module 132 stores data representing graphics to be used. Each graphic may be assigned a corresponding code. Graphics module 132 receives, from applications etc., one or more codes specifying graphics to be displayed along with, if necessary, coordinate data and other graphic property data, and then generates screen image data to output to display controller 156.

Text input module 134, which may be a component of graphics module 132, provides soft keyboards for entering text in various applications (e.g., contacts 137, e-mail 140, IM 141, browser 147, and any other application that needs text input).

GPS module 135 determines the location of the device and provides this information for use in various applications (e.g., to telephone 138 for use in location-based dialing, to camera 143 as picture/video metadata, and to applications that provide location-based services such as weather widgets, local yellow page widgets, and map/navigation widgets).

Applications 136 may include the following modules (or sets of instructions), or a subset or superset thereof:
- contacts module 137 (sometimes called an address book or contact list);
- telephone module 138;
- video conferencing module 139;
- e-mail client module 140;
- instant messaging (IM) module 141;
- workout support module 142;
- camera module 143 for still and/or video images;
- image management module 144;
- browser module 147;
- calendar module 148;
- widget modules 149, which may include one or more of: weather widget 149-1, stocks widget 149-2, calculator widget 149-3, alarm clock widget 149-4, dictionary widget 149-5, and other widgets obtained by the user, as well as user-created widgets 149-6;
- widget creator module 150 for making user-created widgets 149-6;
- search module 151;
- video and music player module 152, which may be made up of a video player module and a music player module;
- notes module 153;
- map module 154; and/or
- online video module 155.

Examples of other applications 136 that may be stored in memory 102 include other word processing applications, other image editing applications, drawing applications, presentation applications, JAVA-enabled applications, encryption, digital rights management, voice recognition, and voice replication.

In conjunction with touch screen 112, display controller 156, contact module 130, graphics module 132, and text input module 134, contacts module 137 may be used to manage an address book or contact list (e.g., stored in application internal state 192 of contacts module 137 in memory 102 or memory 370), including: adding name(s) to the address book; deleting name(s) from the address book; associating telephone number(s), e-mail address(es), physical address(es) or other information with a name; associating an image with a name; categorizing and sorting names; providing telephone numbers or e-mail addresses to initiate and/or facilitate communications by telephone 138, video conference 139, e-mail 140, or IM 141; and so forth.

In conjunction with RF circuitry 108, audio circuitry 110, speaker 111, microphone 113, touch screen 112, display controller 156, contact module 130, graphics module 132, and text input module 134, telephone module 138 may be used to enter a sequence of characters corresponding to a telephone number, access one or more telephone numbers in address book 137, modify a telephone number that has been entered, dial a respective telephone number, conduct a conversation and disconnect or hang up when the conversation is completed. As noted above, the wireless communication may use any of multiple communications standards, protocols and technologies.

In conjunction with RF circuitry 108, audio circuitry 110, speaker 111, microphone 113, touch screen 112, display controller 156, optical sensor 164, optical sensor controller 158, contact module 130, graphics module 132, text input module 134, contact list 137, and telephone module 138, videoconferencing module 139 includes executable instructions to initiate, conduct, and terminate a video conference between a user and one or more other participants in accordance with user instructions.

In conjunction with RF circuitry 108, touch screen 112, display controller 156, contact module 130, graphics module 132, and text input module 134, e-mail client module 140 includes executable instructions to create, send, receive, and manage e-mail in response to user instructions. In conjunction with image management module 144, e-mail client module 140 makes it very easy to create and send e-mails with still or video images taken with camera module 143.

In conjunction with RF circuitry 108, touch screen 112, display controller 156, contact module 130, graphics module 132, and text input module 134, the instant messaging module 141 includes executable instructions to enter a sequence of characters corresponding to an instant message, to modify previously entered characters, to transmit a respective instant message (for example, using a Short Message Service (SMS) or Multimedia Message Service (MMS) protocol for telephony-based instant messages or using XMPP, SIMPLE, or IMPS for Internet-based instant messages), to receive instant messages and to view received instant messages. In some embodiments, transmitted and/or received instant messages may include graphics, photos, audio files, video files and/or other attachments as are supported in a MMS and/or an Enhanced Messaging Service (EMS). As used herein, "instant messaging" refers to both telephony-based messages (e.g., messages sent using SMS or MMS) and Internet-based messages (e.g., messages sent using XMPP, SIMPLE, or IMPS).

In conjunction with RF circuitry 108, touch screen 112, display controller 156, contact module 130, graphics module 132, text input module 134, GPS module 135, map module 154, and music player module 146, workout support module 142 includes executable instructions to create workouts (e.g., with time, distance, and/or calorie burning goals); communicate with workout sensors (sports devices); receive workout sensor data; calibrate sensors used to monitor a workout; select and play music for a workout; and display, store and transmit workout data.

In conjunction with touch screen 112, display controller 156, optical sensor(s) 164, optical sensor controller 158, contact module 130, graphics module 132, and image management module 144, camera module 143 includes executable instructions to capture still images or video (including a video stream) and store them into memory 102, modify characteristics of a still image or video, or delete a still image or video from memory 102.

In conjunction with touch screen 112, display controller 156, contact module 130, graphics module 132, text input module 134, and camera module 143, image management module 144 includes executable instructions to arrange, modify (e.g., edit), or otherwise manipulate, label, delete, present (e.g., in a digital slide show or album), and store still and/or video images.

In conjunction with RF circuitry 108, touch screen 112, display system controller 156, contact module 130, graphics module 132, and text input module 134, browser module 147 includes executable instructions to browse the Internet in accordance with user instructions, including searching, linking to, receiving, and displaying web pages or portions thereof, as well as attachments and other files linked to web pages.

In conjunction with RF circuitry 108, touch screen 112, display system controller 156, contact module 130, graphics module 132, text input module 134, e-mail client module 140, and browser module 147, calendar module 148 includes executable instructions to create, display, modify, and store calendars and data associated with calendars (e.g., calendar entries, to do lists, etc.) in accordance with user instructions.

In conjunction with RF circuitry 108, touch screen 112, display system controller 156, contact module 130, graphics module 132, text input module 134, and browser module 147, widget modules 149 are mini-applications that may be downloaded and used by a user (e.g., weather widget 149-1, stocks widget 149-2, calculator widget 1493, alarm clock widget 149-4, and dictionary widget 149-5) or created by the user (e.g., user-created widget 149-6). In some embodiments, a widget includes an HTML (Hypertext Markup Language) file, a CSS (Cascading Style Sheets) file, and a JavaScript file. In some embodiments, a widget includes an XML (Extensible Markup Language) file and a JavaScript file (e.g., Yahoo! Widgets).

In conjunction with RF circuitry 108, touch screen 112, display system controller 156, contact module 130, graphics module 132, text input module 134, and browser module 147, the widget creator module 150 may be used by a user to create widgets (e.g., turning a user-specified portion of a web page into a widget).

In conjunction with touch screen 112, display system controller 156, contact module 130, graphics module 132, and text input module 134, search module 151 includes executable instructions to search for text, music, sound, image, video, and/or other files in memory 102 that match one or more search criteria (e.g., one or more user-specified search terms) in accordance with user instructions.

In conjunction with touch screen 112, display system controller 156, contact module 130, graphics module 132, audio circuitry 110, speaker 111, RF circuitry 108, and browser module 147, video and music player module 152 includes executable instructions that allow the user to download and play back recorded music and other sound files stored in one or more file formats, such as MP3 or AAC files, and executable instructions to display, present or otherwise play back videos (e.g., on touch screen 112 or on an external, connected display via external port 124). In some embodiments, device 100 may include the functionality of an MP3 player, such as an iPod (trademark of Apple Inc.).

In conjunction with touch screen 112, display controller 156, contact module 130, graphics module 132, and text input module 134, notes module 153 includes executable instructions to create and manage notes, to do lists, and the like in accordance with user instructions.

In conjunction with RF circuitry 108, touch screen 112, display system controller 156, contact module 130, graphics module 132, text input module 134, GPS module 135, and browser module 147, map module 154 may be used to receive, display, modify, and store maps and data associated with maps (e.g., driving directions; data on stores and other points of interest at or near a particular location; and other location-based data) in accordance with user instructions.

In conjunction with touch screen 112, display system controller 156, contact module 130, graphics module 132, audio circuitry 110, speaker 111, RF circuitry 108, text input module 134, e-mail client module 140, and browser module 147, online video module 155 includes instructions that allow the user to access, browse, receive (e.g., by streaming and/or download), play back (e.g., on the touch screen or on an external, connected display via external port 124), send an e-mail with a link to a particular online video, and otherwise manage online videos in one or more file formats, such as H.264. In some embodiments, instant messaging module 141, rather than e-mail client module 140, is used to send a link to a particular online video.

Each of the above identified modules and applications correspond to a set of executable instructions for performing one or more functions described above and the methods described in this application (e.g., the computer-implemented methods and other information processing methods described herein). These modules (i.e., sets of instructions) need not be implemented as separate software programs, procedures or modules, and thus various subsets of these modules may be combined or otherwise re-arranged in various embodiments. In some embodiments, memory 102 may store a subset of the modules and data structures identified above. Furthermore, memory 102 may store additional modules and data structures not described above.

In some embodiments, device 100 is a device where operation of a predefined set of functions on the device is performed exclusively through a touch screen and/or a touchpad. By using a touch screen and/or a touchpad as the primary input control device for operation of device 100, the number of physical input control devices (such as push buttons, dials, and the like) on device 100 may be reduced.

The predefined set of functions that may be performed exclusively through a touch screen and/or a touchpad include navigation between user interfaces. In some embodiments, the touchpad, when touched by the user, navigates device 100 to a main, home, or root menu from any user interface that may be displayed on device 100. In such embodiments, the touchpad may be referred to as a "menu button." In some other embodiments, the menu button may be a physical push button or other physical input control device instead of a touchpad.

Figure 1B:
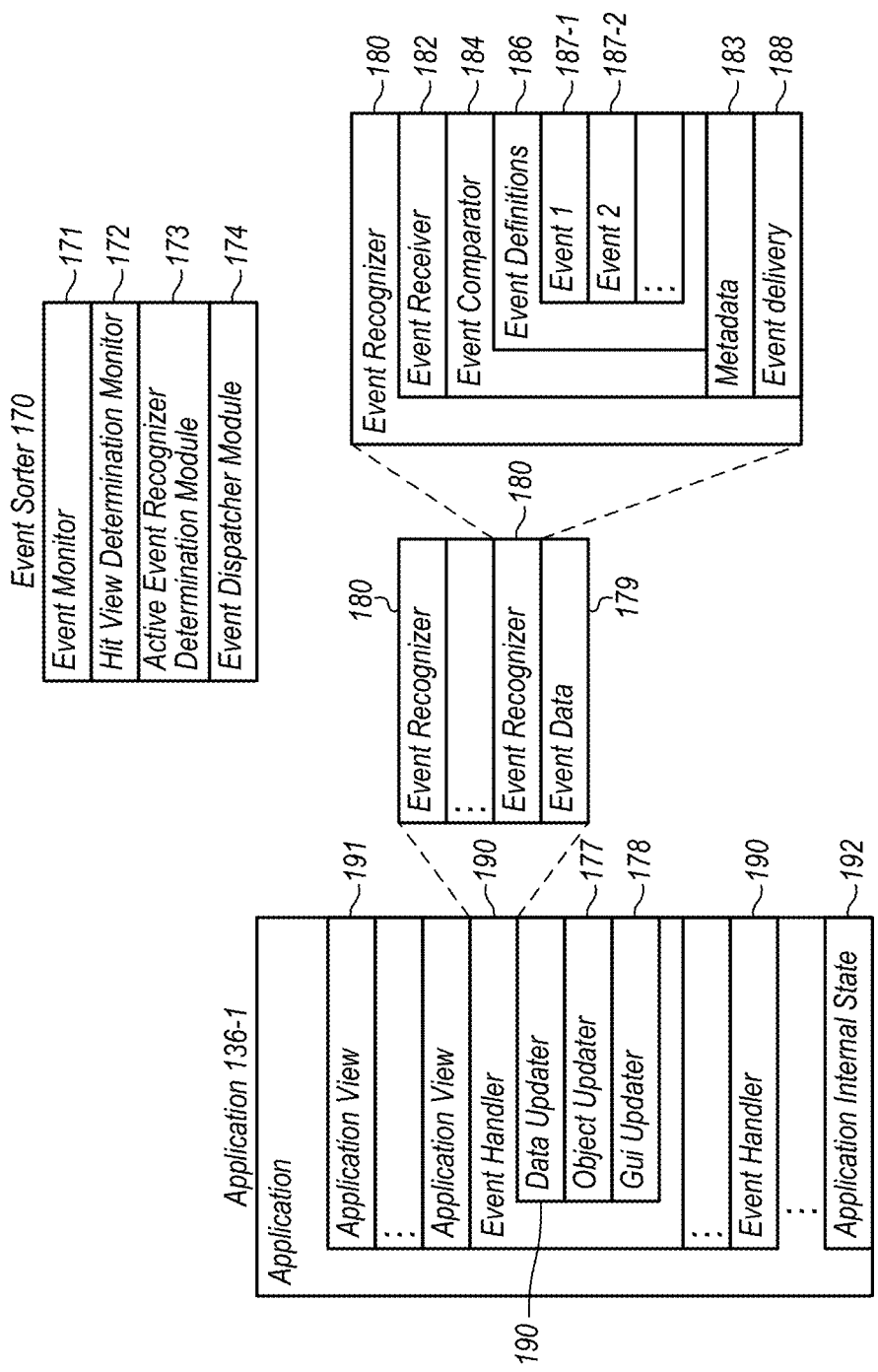
FIG. 1B is a diagram illustrating example components within a mobile device suitable for implementing an environment analysis tool, according to some embodiments.

FIG. 1B is a block diagram illustrating exemplary components for event handling in accordance with some embodiments. In some embodiments, memory 102 (in FIG. 1A) or 370 (FIG. 3) includes event sorter 170 (e.g., in operating system 126) and a respective application 136-1 (e.g., any of the aforementioned applications 137-151, 155, 380-390).

Event sorter 170 receives event information and determines the application 136-1 and application view 191 of application 136-1 to which to deliver the event information. Event sorter 170 includes event monitor 171 and event dispatcher module 174. In some embodiments, application 136-1 includes application internal state 192, which indicates the current application view(s) displayed on touch sensitive display 112 when the application is active or executing. In some embodiments, device/global internal state 157 is used by event sorter 170 to determine which application(s) is (are) currently active, and application internal state 192 is used by event sorter 170 to determine application views 191 to which to deliver event information.

In some embodiments, application internal state 192 includes additional information, such as one or more of:

resume information to be used when application 136-1 resumes execution, user interface state information that indicates information being displayed or that is ready for display by application 136-1, a state queue for enabling the user to go back to a prior state or view of application 136-1, and a redo/undo queue of previous actions taken by the user.

Event monitor 171 receives event information from peripherals interface 118. Event information includes information about a sub-event (e.g., a user touch on touch sensitive display 112, as part of a multi-touch gesture). Peripherals interface 118 transmits information it receives from I/O subsystem 106 or a sensor, such as proximity sensor 166, orientation sensor(s) 168, and/or microphone 113 (through audio circuitry 110). Information that peripherals interface 118 receives from I/O subsystem 106 includes information from touch-sensitive display 112 or a touch-sensitive surface.

In some embodiments, event monitor 171 sends requests to the peripherals interface 118 at predetermined intervals. In response, peripherals interface 118 transmits event information. In other embodiments, peripheral interface 118 transmits event information only when there is a significant event (e.g., receiving an input above a predetermined noise threshold and/or for more than a predetermined duration).

In some embodiments, event sorter 170 also includes a hit view determination module 172 and/or an active event recognizer determination module 173.

Hit view determination module 172 provides software procedures for determining where a sub-event has taken place within one or more views, when touch sensitive display 112 displays more than one view. Views are made up of controls and other elements that a user can see on the display.

Another aspect of the user interface associated with an application is a set of views, sometimes herein called application views or user interface windows, in which information is displayed and touch-based gestures occur. The application views (of a respective application) in which a touch is detected may correspond to programmatic levels within a programmatic or view hierarchy of the application. For example, the lowest level view in which a touch is detected may be called the hit view, and the set of events that are recognized as proper inputs may be determined based, at least in part, on the hit view of the initial touch that begins a touch-based gesture.

Hit view determination module 172 receives information related to sub-events of a touch-based gesture. When an application has multiple views organized in a hierarchy, hit view determination module 172 identifies a hit view as the lowest view in the hierarchy which should handle the sub-event. In most circumstances, the hit view is the lowest level view in which an initiating sub-event occurs (i.e., the first sub-event in the sequence of sub-events that form an event or potential event). Once the hit view is identified by the hit view determination module, the hit view typically receives all sub-events related to the same touch or input source for which it was identified as the hit view.

Active event recognizer determination module 173 determines which view or views within a view hierarchy should receive a particular sequence of sub-events. In some embodiments, active event recognizer determination module 173 determines that only the hit view should receive a particular sequence of sub-events. In other embodiments, active event recognizer determination module 173 determines that all views that include the physical location of a sub-event are actively involved views, and therefore determines that all actively involved views should receive a particular sequence of sub-events. In other embodiments, even if touch sub-events were entirely confined to the area associated with one particular view, views higher in the hierarchy would still remain as actively involved views.

Event dispatcher module 174 dispatches the event information to an event recognizer (e.g., event recognizer 180). In embodiments including active event recognizer determination module 173, event dispatcher module 174 delivers the event information to an event recognizer determined by active event recognizer determination module 173. In some embodiments, event dispatcher module 174 stores in an event queue the event information, which is retrieved by a respective event receiver module 182.

In some embodiments, operating system 126 includes event sorter 170. Alternatively, application 136-1 includes event sorter 170. In yet other embodiments, event sorter 170 is a stand-alone module, or a part of another module stored in memory 102, such as contact/motion module 130.

In some embodiments, application 136-1 includes multiple event handlers 190 and one or more application views 191, each of which includes instructions for handling touch events that occur within a respective view of the application's user interface. Each application view 191 of the application 136-1 includes one or more event recognizers 180. Typically, a respective application view 191 includes multiple event recognizers 180. In other embodiments, one or more of event recognizers 180 are part of a separate module, such as a user interface kit (not shown) or a higher level object from which application 136-1 inherits methods and other properties. In some embodiments, a respective event handler 190 includes one or more of: data updater 176, object updater 177, GUI updater 178, and/or event data 179 received from event sorter 170. Event handler 190 may utilize or call data updater 176, object updater 177 or GUI updater 178 to update the application internal state 192. Alternatively, one or more of the application views 191 includes one or more respective event handlers 190. Also, in some embodiments, one or more of data updater 176, object updater 177, and GUI updater 178 are included in a respective application view 191.

A respective event recognizer 180 receives event information (e.g., event data 179) from event sorter 170, and identifies an event from the event information. Event recognizer 180 includes event receiver 182 and event comparator 184. In some embodiments, event recognizer 180 also includes at least a subset of: metadata 183, and event delivery instructions 188 (which may include sub-event delivery instructions).

Event receiver 182 receives event information from event sorter 170. The event information includes information about a sub-event, for example, a touch or a touch movement. Depending on the sub-event, the event information also includes additional information, such as location of the sub-event. When the sub-event concerns motion of a touch the event information may also include speed and direction of the sub-event. In some embodiments, events include rotation of the device from one orientation to another (e.g., from a portrait orientation to a landscape orientation, or vice versa), and the event information includes corresponding information about the current orientation (also called device attitude) of the device.

Event comparator 184 compares the event information to predefined event or sub-event definitions and, based on the comparison, determines an event or sub-event, or determines or updates the state of an event or sub-event. In some embodiments, event comparator 184 includes event definitions 186. Event definitions 186 contain definitions of events (e.g., predefined sequences of sub-events), for example, event 1 (187-1), event 2 (187-2), and others. In some embodiments, sub-events in an event 187 include, for example, touch begin, touch end, touch movement, touch cancellation, and multiple touching. In one example, the definition for event 1 (187-1) is a double tap on a displayed object. The double tap, for example, includes a first touch (touch begin) on the displayed object for a predetermined phase, a first lift-off (touch end) for a predetermined phase, a second touch (touch begin) on the displayed object for a predetermined phase, and a second lift-off (touch end) for a predetermined phase. In another example, the definition for event 2 (187-2) is a dragging on a displayed object. The dragging, for example, includes a touch (or contact) on the displayed object for a predetermined phase, a movement of the touch across touch-sensitive display 112, and lift-off of the touch (touch end). In some embodiments, the event also includes information for one or more associated event handlers 190.

In some embodiments, event definition 187 includes a definition of an event for a respective user-interface object. In some embodiments, event comparator 184 performs a hit test to determine which user-interface object is associated with a sub-event. For example, in an application view in which three user-interface objects are displayed on touch-sensitive display 112, when a touch is detected on touch-sensitive display 112, event comparator 184 performs a hit test to determine which of the three user-interface objects is associated with the touch (sub-event). If each displayed object is associated with a respective event handler 190, the event comparator uses the result of the hit test to determine which event handler 190 should be activated. For example, event comparator 184 selects an event handler associated with the sub-event and the object triggering the hit test.

In some embodiments, the definition for a respective event 187 also includes delayed actions that delay delivery of the event information until after it has been determined whether the sequence of sub-events does or does not correspond to the event recognizer's event type.

When a respective event recognizer 180 determines that the series of sub-events do not match any of the events in event definitions 186, the respective event recognizer 180 enters an event impossible, event failed, or event ended state, after which it disregards subsequent sub-events of the touch-based gesture. In this situation, other event recognizers, if any, that remain active for the hit view continue to track and process sub-events of an ongoing touch-based gesture.

In some embodiments, a respective event recognizer 180 includes metadata 183 with configurable properties, flags, and/or lists that indicate how the event delivery system should perform sub-event delivery to actively involved event recognizers. In some embodiments, metadata 183 includes configurable properties, flags, and/or lists that indicate how event recognizers may interact with one another. In some embodiments, metadata 183 includes configurable properties, flags, and/or lists that indicate whether sub-events are delivered to varying levels in the view or programmatic hierarchy.

In some embodiments, a respective event recognizer 180 activates event handler 190 associated with an event when one or more particular sub-events of an event are recognized. In some embodiments, a respective event recognizer 180 delivers event information associated with the event to event handler 190. Activating an event handler 190 is distinct from sending (and deferred sending) sub-events to a respective hit view. In some embodiments, event recognizer 180 throws a flag associated with the recognized event, and event handler 190 associated with the flag catches the flag and performs a predefined process.

In some embodiments, event delivery instructions 188 include sub-event delivery instructions that deliver event information about a sub-event without activating an event handler. Instead, the sub-event delivery instructions deliver event information to event handlers associated with the series of sub-events or to actively involved views. Event handlers associated with the series of sub-events or with actively involved views receive the event information and perform a predetermined process.

In some embodiments, data updater 176 creates and updates data used in application 136-1. For example, data updater 176 updates the telephone number used in contacts module 137, or stores a video file used in video player module 145. In some embodiments, object updater 177 creates and updates objects used in application 136-1. For example, object updater 176 creates a new user-interface object or updates the position of a user-interface object. GUI updater 178 updates the GUI. For example, GUI updater 178 prepares display information and sends it to graphics module 132 for display on a touch-sensitive display.

In some embodiments, event handler(s) 190 includes or has access to data updater 176, object updater 177, and GUI updater 178. In some embodiments, data updater 176, object updater 177, and GUI updater 178 are included in a single module of a respective application 136-1 or application view 191. In other embodiments, they are included in two or more software modules.

It shall be understood that the foregoing discussion regarding event handling of user touches on touch-sensitive displays also applies to other forms of user inputs to operate mobile devices 100 with input-devices, not all of which are initiated on touch screens, e.g., coordinating mouse movement and mouse button presses with or without single or multiple keyboard presses or holds, user movements taps, drags, scrolls, etc., on touch-pads, pen stylus inputs, movement of the device, oral instructions, detected eye movements, biometric inputs, and/or any combination thereof, which may be utilized as inputs corresponding to sub-events which define an event to be recognized.

Figure 2:
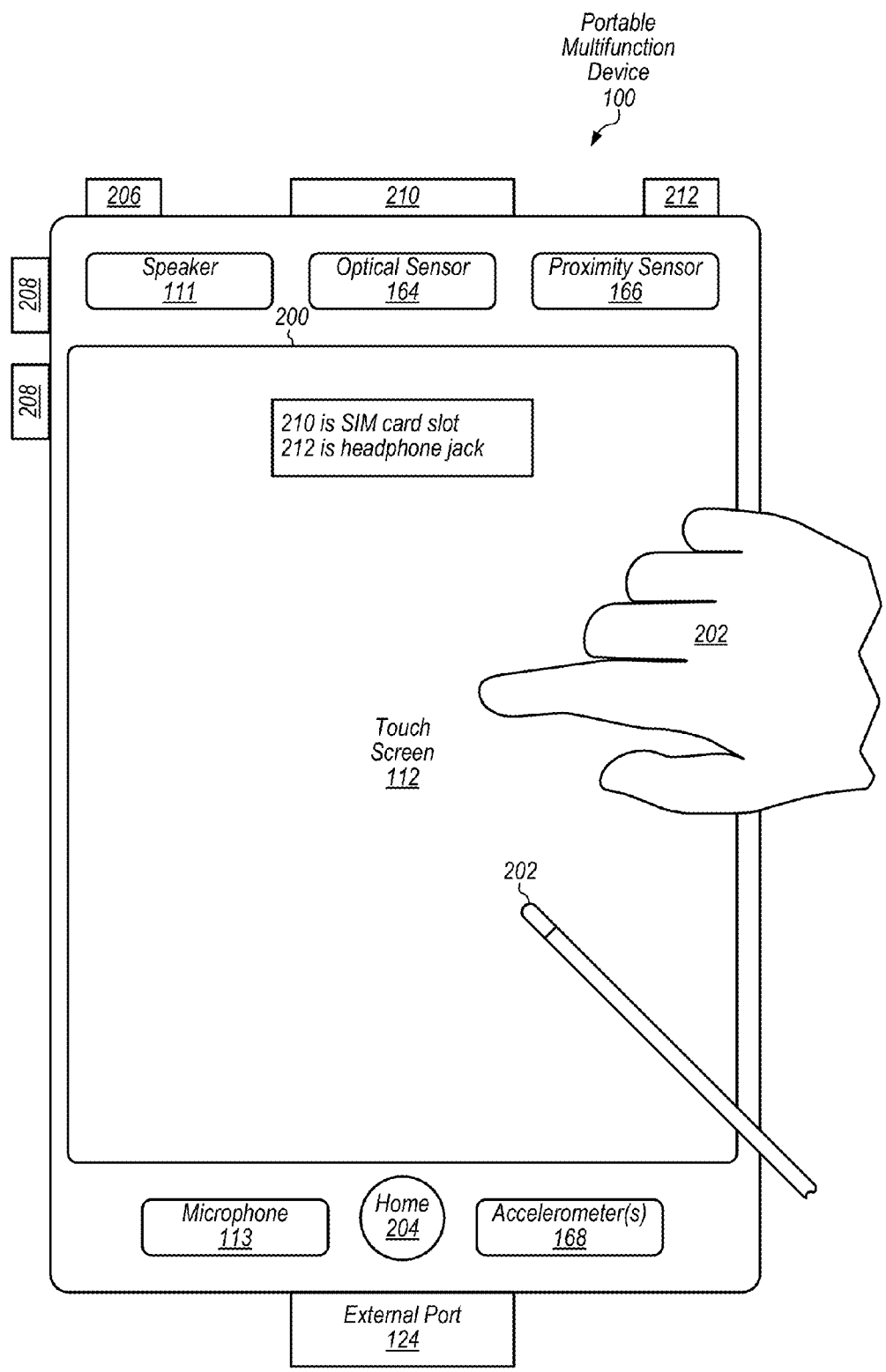
FIG. 2 illustrates a touch screen on a mobile device, according to some embodiments.

FIG. 2 illustrates a portable mobile device 100 having a touch screen 112 in accordance with some embodiments. The touch screen may display one or more graphics within user interface (UI) 200. In this embodiment, as well as others described below, a user may select one or more of the graphics by making a gesture on the graphics, for example, with one or more fingers 202 (not drawn to scale in the figure) or one or more styluses 203 (not drawn to scale in the figure). In some embodiments, selection of one or more graphics occurs when the user breaks contact with the one or more graphics. In some embodiments, the gesture may include one or more taps, one or more swipes (from left to right, right to left, upward and/or downward) and/or a rolling of a finger (from right to left, left to right, upward and/or downward) that has made contact with device 100. In some embodiments, inadvertent contact with a graphic may not select the graphic. For example, a swipe gesture that sweeps over an application icon may not select the corresponding application when the gesture corresponding to selection is a tap.

Device 100 may also include one or more physical buttons, such as "home" or menu button 204. As described previously, menu button 204 may be used to navigate to any application 136 in a set of applications that may be executed on device 100. Alternatively, in some embodiments, the menu button is implemented as a soft key in a GUI displayed on touch screen 112.

In one embodiment, device 100 includes touch screen 112, menu button 204, push button 206 for powering the device on/off and locking the device, volume adjustment button(s) 208, Subscriber Identity Module (SIM) card slot 210, head set jack 212, and docking/charging external port 124. Push button 206 may be used to turn the power on/off on the device by depressing the button and holding the button in the depressed state for a predefined time interval; to lock the device by depressing the button and releasing the button before the predefined time interval has elapsed; and/or to unlock the device or initiate an unlock process. In an alternative embodiment, device 100 also may accept verbal input for activation or deactivation of some functions through microphone 113.

It should be noted that, although many of the following examples will be given with reference to inputs on touch screen 112 (where the touch sensitive surface and the display are combined), a touch-sensitive surface that is separate from the display may be used instead of touch screen 112.

Map Service Operating Environment

Figure 9:
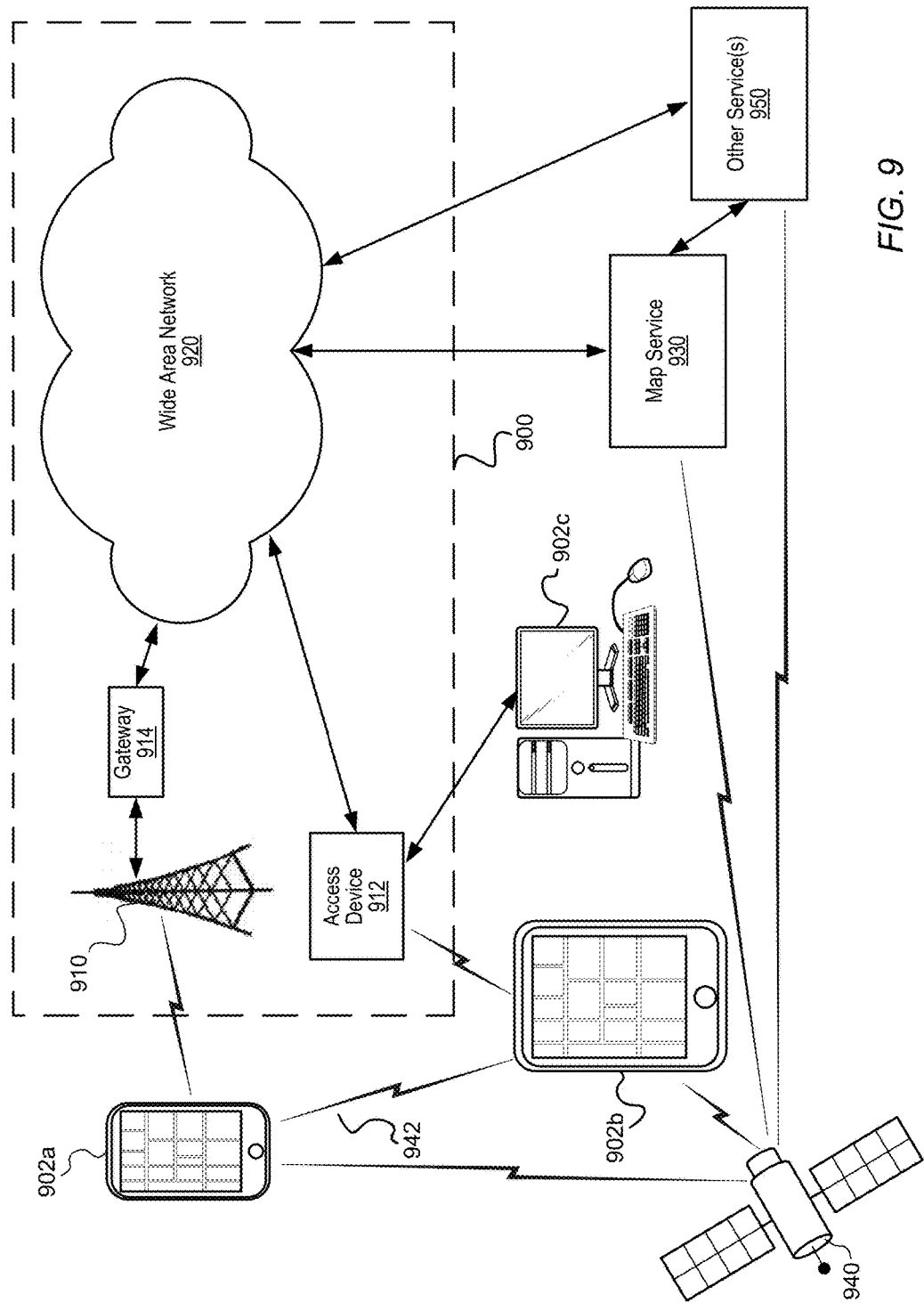
FIG. 9 depicts elements of a map service operating environment, according to some embodiments.

Various embodiments of a map tool may operate within a map service operating environment. FIG. 9 illustrates a map service operating environment, according to some embodiments. A map service 930 may provide map services for one or more client devices 902*a*-902*c* in communication with the map service 930 through various communication methods and protocols. A map service 930 generally may provide map information and other map-related data, such as two-dimensional map image data (e.g., aerial view of roads utilizing satellite imagery), three-dimensional map image data (e.g., traversable map with three-dimensional features, such as buildings), route and direction calculation (e.g., ferry route calculations or directions between two points for a pedestrian), real-time navigation data (e.g., turn-by-turn visual navigation data in two or three dimensions), location data (e.g., where is the client device currently located), and other geographic data (e.g., wireless network coverage, weather, traffic information, or nearby points-of-interest). In various embodiments, the map service data may include localized labels for different countries or regions; localized labels may be utilized to present map labels (e.g., street names, city names, points of interest) in different languages on client devices. Client devices 902*a*-902*c* may utilize these map services by obtaining map service data. Client devices 902*a*-902*c* may implement various techniques to process map service data. Client devices 902*a*-902*c* may then provide map services to various entities, including, but not limited to, users, internal software or hardware modules, and/or other systems or devices external to the client devices 902*a*-902*c*.

In some embodiments, a map service may be implemented by one or more nodes in a distributed computing system. Each node may be assigned one or more services or components of a map service. Some nodes may be assigned the same map service or component of a map service. A load balancing node may distribute access or requests to other nodes within a map service. In some embodiments a map service may be implemented as a single system, such as a single server. Different modules or hardware devices within a server may implement one or more of the various services provided by a map service.

A map service may provide map services by generating map service data in various formats. In some embodiments, one format of map service data may be map image data. Map image data may provide image data to a client device so that the client device may process the image data (e.g., rendering and/or displaying the image data as a two-dimensional or three-dimensional map). Map image data, whether in two or three dimensions, may specify one or more map tiles. A map tile may be a portion of a larger map image. Assembling together the map tiles of a map may produce the original map. Tiles may be generated from map image data, routing or navigation data, or any other map service data. In some embodiments map tiles may be raster-based map tiles, with tile sizes ranging from any size both larger and smaller than a commonly-used 256 pixel by 256 pixel tile. Raster-based map tiles may be encoded in any number of standard digital image representations including, but not limited to, Bitmap (.bmp), Graphics Interchange Format (.gif), Joint Photographic Experts Group (.jpg, .jpeg, etc.), Portable Networks Graphic (.png), or Tagged Image File Format (.tiff). In some embodiments, map tiles may be vector-based map tiles, encoded using vector graphics, including, but not limited to, Scalable Vector Graphics (.svg) or a Drawing File (.drw). Embodiments may also include tiles with a combination of vector and raster data. Metadata or other information pertaining to the map tile may also be included within or along with a map tile, providing further map service data to a client device. In various embodiments, a map tile may be encoded for transport utilizing various standards and/or protocols, some of which are described in examples below.

In various embodiments, map tiles may be constructed from image data of different resolutions depending on zoom level. For instance, for low zoom level (e.g., world or globe view), the resolution of map or image data need not be as high relative to the resolution at a high zoom level (e.g., city or street level). For example, when in a globe view, there may be no need to render street level artifacts as such objects would be so small as to be negligible in many cases.

A map service may perform various techniques to analyze a map tile before encoding the tile for transport. This analysis may optimize map service performance for both client devices and a map service. In some embodiments map tiles may be analyzed for complexity, according to vector-based graphic techniques, and constructed utilizing complex and non-complex layers. Map tiles may also be analyzed for common image data or patterns that may be rendered as image textures and constructed by relying on image masks. In some embodiments, raster-based image data in a map tile may contain certain mask values, which are associated with one or more textures. Embodiments may also analyze map tiles for specified features that may be associated with certain map styles that contain style identifiers.

Other map services may generate map service data relying upon various data formats separate from a map tile. For example, map services that provide location data may utilize data formats conforming to location service protocols, such as, but not limited to, Radio Resource Location services Protocol (RRLP), TIA 801 for Code Division Multiple Access (CDMA), Radio Resource Control (RRC) position protocol, or LTE Positioning Protocol (LPP). Embodiments may also receive or request data from client devices identifying device capabilities or attributes (e.g., hardware specifications or operating system version) or communication capabilities (e.g., device communication bandwidth as determined by wireless signal strength or wire or wireless network type).

A map service may obtain map service data from internal or external sources. For example, satellite imagery used in map image data may be obtained from external services, or internal systems, storage devices, or nodes. Other examples may include, but are not limited to, GPS assistance servers, wireless network coverage databases, business or personal directories, weather data, government information (e.g., construction updates or road name changes), or traffic reports. Some embodiments of a map service may update map service data (e.g., wireless network coverage) for analyzing future requests from client devices.

Various embodiments of a map service may respond to client device requests for map services. These requests may be a request for a specific map or portion of a map. Embodiments may format requests for a map as requests for certain map tiles. In some embodiments, requests may also supply the map service with starting locations (or current locations) and destination locations for a route calculation. A client device may also request map service rendering information, such as map textures or stylesheets. In at least some embodiments, requests may also be one of a series of requests implementing turn-by-turn navigation. Requests for other geographic data may include, but are not limited to, current location, wireless network coverage, weather, traffic information, or nearby points-of-interest.

A map service may, in some embodiments, may analyze client device requests to optimize a device or map service operation. For example, a map service may recognize that the location of a client device is in an area of poor communications (e.g., weak wireless signal) and send more map service data to supply a client device in the event of loss in communication or send instructions to utilize different client hardware (e.g., orientation sensors) or software (e.g., utilize wireless location services or Wi-Fi positioning instead of GPS-based services). In another example, a map service may analyze a client device request for vector-based map image data and determine that raster-based map data better optimizes the map image data according to the image's complexity. Embodiments of other map services may perform similar analysis on client device requests and as such the above examples are not intended to be limiting.

Various embodiments of client devices (e.g., client devices 902a-902c) may be implemented on different device types. Examples of a portable-mobile device include the devices illustrated in FIGS. 1 through 3 and 9, such as mobile device 100 and mobile device 300. Client devices 902a-902c may utilize map service 930 through various communication methods and protocols described below. In some embodiments, client devices 902a-902c may obtain map service data from map service 930. Client devices 902a-902c may request or receive map service data. Client devices 902a-902c may then process map service data (e.g., render and/or display the data) and may send the data to another software or hardware module on the device or to an external device or system.

A client device may, according to some embodiments, implement techniques to render and/or display maps. These maps may be requested or received in various formats, such as map tiles described above. A client device may render a map in two-dimensional or three-dimensional views. Some embodiments of a client device may display a rendered map and allow a user, system, or device providing input to manipulate a virtual camera in the map, changing the map display according to the virtual camera's position, orientation, and field-of-view. Various forms and input devices may be implemented to manipulate a virtual camera. In some embodiments, touch input, through certain single or combination gestures (e.g., touch-and-hold or a swipe) may manipulate the virtual camera. Other embodiments may allow manipulation of the device's physical location to manipulate a virtual camera. For example, a client device may be tilted up from its current position to manipulate the virtual camera to rotate up. In another example, a client device may be tilted forward from its current position to move the virtual camera forward. Other input devices to the client device may be implemented including, but not limited to, auditory input (e.g., spoken words), a physical keyboard, mouse, and/or a joystick.

Embodiments may provide various visual feedback to virtual camera manipulations, such as displaying an animation of possible virtual camera manipulations when transitioning from two-dimensional map views to three-dimensional map views. Embodiments may also allow input to select a map feature or object (e.g., a building) and highlight the object, producing a blur effect that maintains the virtual camera's perception of three-dimensional space.

In some embodiments, a client device may implement a navigation system (e.g., turn-by-turn navigation). A navigation system provides directions or route information, which may be displayed to a user. Embodiments of a client device may request directions or a route calculation from a map service. A client device may receive map image data and route data from a map service. In some embodiments, a client device may implement a turn-by-turn navigation system, which provides real-time route and direction information based upon location information and route information received from a map service and/or other location system, such as Global Positioning Satellite (GPS). A client device may display map image data that reflects the current location of the client device and update the map image data in real-time. A navigation system may provide auditory or visual directions to follow a certain route.

A virtual camera may be implemented to manipulate navigation map data according to some embodiments. Some embodiments of client devices may allow the device to adjust the virtual camera display orientation to bias toward the route destination. Embodiments may also allow virtual camera to navigation turns simulating the inertial motion of the virtual camera.

Client devices may implement various techniques to utilize map service data from map service. Embodiments may implement some techniques to optimize rendering of two-dimensional and three-dimensional map image data. In some embodiments, a client device may locally store rendering information. For example, a client may store a stylesheet which provides rendering directions for image data containing style identifiers. In another example, common image textures may be stored to decrease the amount of map image data transferred from a map service. Client devices may also implement various modeling techniques to render two-dimensional and three-dimensional map image data, examples of which include, but are not limited to: generating three-dimensional buildings out of two-dimensional building footprint data; modeling two-dimensional and three-dimensional map objects to determine the client device communication environment; generating models to determine whether map labels are seen from a certain virtual camera position; and generating models to smooth transitions between map image data. Some embodiments of client devices may also order or prioritize map service data in certain techniques. For example, a client device may detect the motion or velocity of a virtual camera, which if exceeding certain threshold values, lower-detail image data will be loaded and rendered of certain areas. Other examples include: rendering vector-based curves as a series of points, preloading map image data for areas of poor communication with a map service, adapting textures based on display zoom level, or rendering map image data according to complexity.

In some embodiments, client devices may communicate utilizing various data formats separate from a map tile. For example, some client devices may implement Assisted Global Positioning Satellites (A-GPS) and communicate with location services that utilize data formats conforming to location service protocols, such as, but not limited to, Radio Resource Location services Protocol (RRLP), TIA 801 for Code Division Multiple Access (CDMA), Radio Resource Control (RRC) position protocol, or LTE Positioning Protocol (LPP). Client devices may also receive GPS signals directly. Embodiments may also send data, with or without solicitation from a map service, identifying the client device's capabilities or attributes (e.g., hardware specifications or operating system version) or communication capabilities (e.g., device communication bandwidth as determined by wireless signal strength or wire or wireless network type).

FIG. 9 illustrates one possible embodiment of an operating environment 900 for a map service 930 and client devices 902a-902c. In some embodiments, devices 902a, 902b, and 902c can communicate over one or more wire or wireless networks 910. For example, wireless network 910, such as a cellular network, can communicate with a wide area network (WAN) 920, such as the Internet, by use of gateway 914. A gateway 914 may provide a packet oriented mobile data service, such as General Packet Radio Service (GPRS), or other mobile data service allowing wireless networks to transmit data to other networks, such as wide area network 920. Likewise, access device 912 (e.g., IEEE 802.11g wireless access device) can provide communication access to WAN 920. Devices 902a and 902b can be any portable electronic or computing device capable of communicating with a map service, such as a portable mobile device described below with respect to FIGS. 1 to 3 and 9. Device 902c can be any non-portable electronic or computing device capable of communicating with a map service, such as a system described below in FIG. 9.

In some embodiments, both voice and data communications can be established over wireless network 910 and access device 912. For example, device 902a can place and receive phone calls (e.g., using voice over Internet Protocol (VoIP) protocols), send and receive e-mail messages (e.g., using Simple Mail Transfer Protocol (SMTP) or Post Office Protocol 3 (POP3)), and retrieve electronic documents and/or streams, such as web pages, photographs, and videos, over wireless network 910, gateway 914, and WAN 920 (e.g., using Transmission Control Protocol/Internet Protocol (TCP/IP) or User Datagram Protocol (UDP)). Likewise, in some implementations, devices 902b and 902c can place and receive phone calls, send and receive e-mail messages, and retrieve electronic documents over access device 912 and WAN 920. In various embodiments, any of the illustrated client device may communicate with map service 930 and/or other service(s) 950 using a persistent connection established in accordance with one or more security protocols, such as the Secure Sockets Layer (SSL) protocol or the Transport Layer Security (TLS) protocol.

Devices 902a and 902b can also establish communications by other means. For example, wireless device 902a can communicate with other wireless devices (e.g., other devices 902a or 902b, cell phones) over the wireless network 910. Likewise devices 902a and 902b can establish peer-to-peer communications 942 (e.g., a personal area network) by use of one or more communication subsystems, such as Bluetooth® communication from Bluetooth Special Interest Group, Inc. of Kirkland, Wash. 902c can also establish peer to peer communications with devices 902a or 902b. (not pictured). Other communication protocols and topologies can also be implemented. Devices 902a and 902b may also receive Global Positioning Satellite (GPS) signals from GPS 940.

Devices 902a, 902b, and 902c can communicate with map service 930 over the one or more wire and/or wireless networks, 910 or 912. For example, map service 930 can provide a map service data to rendering devices 902a, 902b, and 902c. Map service 930 may also communicate with other services 950 to obtain data to implement map services. Map service 930 and other services 950 may also receive GPS signals from GPS 940.

In various embodiments, map service 930 and/or other service(s) 950 may be configured to process search requests from any of client devices. Search requests may include but are not limited to queries for business, address, residential locations, points of interest, or some combination thereof. Map service 930 and/or other service(s) 950 may be configured to return results related to a variety of parameters including but not limited to a location entered into an address bar or other text entry field (including abbreviations and/or other shorthand notation), a current map view (e.g., user may be viewing one location on the mobile device while residing in another location), current location of the user (e.g., in cases where the current map view did not include search results), and the current route (if any). In various embodiments, these parameters may affect the composition of the search results (and/or the ordering of the search results) based on different priority weightings. In various embodiments, the search results that are returned may be a subset of results selected based on specific criteria include but not limited to a quantity of times the search result (e.g., a particular point of interest) has been requested, a measure of quality associated with the search result (e.g., highest user or editorial review rating), and/or the volume of reviews for the search results (e.g., the number of times the search result has been review or rated).

In various embodiments, map service 930 and/or other service(s) 950 may be configured to provide auto-complete search results that may be displayed on the client device, such as within the mapping application. For instance, auto-complete search results may populate a portion of the screen as the user enters one or more search keywords on the mobile device. In some cases, this feature may save the user time as the desired search result may be displayed before the user enters the full search query. In various embodiments, the auto complete search results may be search results found by the client on the client device (e.g., bookmarks or contacts), search results found elsewhere (e.g., from the internet) by map service 930 and/or other service(s) 950, and/or some combination thereof. As is the case with commands, any of the search queries may be entered by the user via voice or through typing. The mobile device may be configured to display search results graphically within any of the map display described herein. For instance, a pin or other graphical indicator may specify locations of search results as points of interest. In various embodiments, responsive to a user selection of one of these points of interest (e.g., a touch selection, such as a tap), the mobile device may be configured to display additional information about the selected point of interest including but not limited to ratings, reviews or review snippets, hours of operation, store status (e.g., open for business, permanently closed, etc.), and/or images of a storefront for the point of interest. In various embodiments, any of this information may be displayed on a graphical information card that is displayed in response to the user's selection of the point of interest.

In various embodiments, map service 930 and/or other service(s) 950 may provide one or more feedback mechanisms to receive feedback from client devices 902*a-c*. For instance, client devices may provide feedback on search results to map service 930 and/or other service(s) 950 (e.g., feedback specifying ratings, reviews, temporary or permanent business closures, errors etc.); this feedback may be used to update information about points of interest in order to provide more accurate or more up-to-date search results in the future. In some embodiments, map service 930 and/or other service(s) 950 may provide testing information to the client device (e.g., an AB test) to determine which search results are best. For instance, at random intervals, the client device may receive and present two search results to a user and allow the user to indicate the best result. The client device may report the test results to map service 930 and/or other service(s) 950 to improve future search results based on the chosen testing technique, such as an A/B test technique in which a baseline control sample is compared to a variety of single-variable test samples in order to improve results.

Example Mapping Functionality

FIG. 3 illustrates another example of a mobile device that may implement a map tool in accord with the embodiments described, where the mobile device may be configured in a manner similar to the mobile device described above. In the illustrated embodiment, a mobile device 300 includes a mapping application (e.g., map module 154 described above) that may be stored in one or more memories of mobile device 300 and executed on one or more processors of mobile device 300. As is the case for the mobile device described above, mobile device 300 may include one or more controls 302 for operating the mobile device. These controls may include but are not limited to power controls for turning the device on and off, volume controls for adjusting the ear piece volume or the speaker volume, menu controls for navigation functions of the device, and function controls for initiating one or more function or actions on the device. Controls 302 may include hardware controls or software controls. For instance, the bottom left corner of electronic display 312 includes a graphical representation of a control 312 that may be selected by a user, such as by way of touch in accordance with the touch screen functionality described above.

Mobile device 300 may also include other components similar to those described above, such as a microphone 304, an earpiece 306 (e.g., a speaker through which to convey audio representations of telephone calls), an optical sensor 308, and/or a speaker 310. Each of these components may be configured in a similar manner to those like-named components of FIG. 2 described above. Furthermore, electronic display 312 may be configured with touch screen capability, such as touch screen 112 described above. In various embodiments, controls (e.g., on screen control(s) 302) may be utilized to perform any of a variety of map-related functions including but not limited to zoom in, zoom out, rotate screen, pan screen, toggle views (e.g., two-dimensions to three dimensions and vice versa), and/or another map related activity. In various embodiments, one or more gestures may be utilized to perform any of the aforesaid map controls (with or without the use of an actual graphical on-screen control). In one non-limiting example, a one figure gesture may be utilized to adjust the pitch within a three-dimensional map view.

As noted above, mobile device 300 includes a mapping application that may be stored in one or more memories of mobile device 300 and executed on one or more processors of mobile device 300. In the illustrated embodiment, the graphical representation of the mapping application may include a map 314 of a geographic region. This map may be presented as a two-dimensional map or a three-dimensional map, the selection of which may be specified through, e.g., a user-configurable parameter of the mapping application. In some embodiments, the mobile device may toggle between two-dimensional map or three-dimensional map views responsive to input from any input component of the mobile device. In one non-limiting example, input from orientation sensor(s) 168 may initiate the transition from a two-dimensional map view to a three-dimensional map, and vice versa. For instance, one or more of orientation sensor(s) 168 may detect a tilt (e.g., a user-initiated tilt) in the orientation of the mobile device and, in response, initiate the aforesaid toggling.

Map 314 may include a graphical position indicator 316, which may represent the location of the mobile device within the geographic region of the map. Generally position indicator 316 may represent the current or real-time position of the mobile device, although it should be understood that in some cases there may exist some small amount of temporal latency between the actual position of the mobile device and the graphical representation of that location (e.g., position indicator 316). This may occur, e.g., when the mobile device is in motion. In various embodiments, the mobile device may be configured to perform map matching including but not limited to aligning a sequence of observed user positions with a road network on a digital map. In various embodiments, the mobile device may be configured to perform a "snap to" function in which the graphical position indicator 316 is aligned onto a roadway when the user's position falls within in a specified threshold distance of the roadway.

Furthermore, mobile device 300 may generally be operated by a user. For example, mobile device 300 may in some cases be a smartphone utilized by an individual to make phone calls, send text messages, browse the internet, etc. As use of mobile device by an individual generally implies the individual is proximate to the mobile device (e.g., the user may be holding the device in his or her hand), references herein to the location of the device and the location of the user may be considered to be synonymous. However, it should be understood that in some cases the actual position of the mobile device and the user of that device may differ by some distance. For instance, the user may place his or her mobile device on a table of an outdoor café while sitting in a nearby chair. In this case, the position of the device and the position of the user may differ by some small amount. In another example, mobile device 300 may be mounted on a car dashboard (e.g., for use as a navigation device) while the user of the device sits nearby (e.g., in the driver seat of the car). In this case as well, the position of the device and the position of the user may differ by some small amount. Despite these small differences in position, generally the position of the mobile device and the position of the mobile device user may be considered to coincide.

In various embodiments, the map 314 displayed by the mobile device may include one or more roads (e.g., roads 318*a-b*), buildings (not illustrated), terrain features (e.g., hills, mountains) (not illustrated), parks (not illustrated), water bodies (not illustrated), and/or any other item that may be conveyed by a map. In some cases, the map may also include other map or navigation information including but limited to readouts from one or more of a directional compass, an altimeter, and/or a thermometer.

In various embodiments, the mapping application may be configured to generate directions from an origination (e.g., an address or a user's current position) to a destination (e.g., an address, landmark, bookmarked/saved location, or point of interest). For instance, an indication of the origination and/or destination may be input into the multi function device by the user. The mobile device may generate one or more candidate routes between those two points. The mobile device may select one of those routes for display on the device. In other cases, multiple candidate routes may be presented to the user and the user may select a preferred route. In the illustrated embodiment, one route is illustrated as route 320. The route may also include turn-by-turn directions which may be presented to the user (in 2D or 3D), such as a graphical indication to perform a turn 322a from road 318a to road 318b. In some embodiments, this graphical indication to perform a turn may be supplemented or substituted with an audible indication to turn, such as a voice command from speaker 310 that indicates the user is to "turn left in 100 yards," for example. In some embodiments, the route that is selected may be presented to the user as a route overview. For instance, before proceeding with navigation, the mobile device may generate a route overview display that graphically indicates key information for the route, such as key turns, route distance and/or an estimated time for traversing the route. In some cases, the mobile device may be configured to generate a display of driving maneuvers (e.g., turns, lane changes, etc.) that occur in quick succession, either in the route overview or during actual navigation. This information may help the user safely prepare for such maneuvers. In some cases, the route information may be presented in a list format, such as a list of turns or other maneuvers.

In various embodiments, the mapping application of the mobile device may be configured to track the position of the user over time and correspondingly adjust the graphical position indicator 316 to indicate the new position. For instance, the mapping application may determine that the user is traveling along route 320 from position information (e.g., information from GPS module 135) and update the map 314 accordingly. For instance, in some cases the map 314 may remain stationary while position indicator 316 is moved along the route. In other cases, position indicator 316 may remain stationary or "fixed" while map 314 is moved (e.g., panned, turned, etc.) around the position indicator.

In various embodiments, the mobile device may be configured to display alternate or contingency routes. In some cases, these routes may be selectable by the user (e.g., via the touch screen interface). In other cases, the mobile device may select a best route based on one or more parameters, such as shortest distance or time. In some cases, these parameters or preferences may be set by the user.

As described in more detail below, the mobile device may in various embodiments receive routing information that specifies a route from a map service. In some case, the mobile device may carry out navigation guidance in accordance with this route. However, in some cases, the mobile device may perform a reroute operation in order to generate a new route to the destination. For instance, the user may have deviated from the original route or explicitly requested a new route. In some cases, the mobile device may perform rerouting based on cached map data stored on the mobile device.

In various embodiments, the mobile device may be configured to perform route correction based on real-time data, such as updates in map information, road conditions, traffic conditions, and/or weather conditions. For instance, the mobile device may be configured to alter a route such that the route avoids a construction zone or a dangerous storm cell.

In various embodiments, the mobile device may be configured to perform lane guidance independently or as part of navigation guidance. For instance, the mobile device may, in response to detecting that multiple turns follow in quick succession, provide the user with a direction or suggestion as to which lane to occupy. For instance, a voice or visual indication may specify that the user "turn right, then move to the left lane" in anticipation of a subsequent left turn. In another example, the mobile device may detect one or more lane closures (e.g., due to construction or other reasons) and instruct the user to avoid such lanes.

In various embodiments, the mobile device may be configured to generate voice prompts for directions. For instance, during navigation guidance, the mobile device may be configured to generate audio representations of the next turn or driving maneuver on the route. For instance, the mobile device may be configured to audibly indicate the user should "turn left in 100 yards" or some other audible indication of a maneuver.

In various embodiments, the mobile device may be responsive to various voice commands for performing actions including a command to obtain a route. For instance, the mobile device may interpret the user's voice through a microphone or other transducer of the mobile device. The user may specify an origination and a destination for the requested route. In various embodiments, the mobile device may be configured to utilize the user's current location as the origination for the route.

In various embodiments, the mobile device may be configured to perform a search along a specific route, such as current navigation route. For instance, the user of the mobile device may request the location of points of interest, such as fuel stations or restaurants. However, if a user is traveling along a particular route, they may not be particularly interested in points of interest that are not proximate to that route. As such, the mobile device may be configured to scope any searches to points of interested within a specified distance away from the route. In various embodiments, this distance may be a configurable parameter.

In various embodiments, the mobile device may be configured to display various graphical layers including but not limited to a graphical map information, aerial images (e.g., satellite-acquired images), and/or traffic information. For instance, in the traffic information example, the mobile device may overlay color coded traffic information on roadways to indicate the speed at which traffic is flowing. For example, green color coding may be used to indicate traffic is flowing normally, and yellow or red may be used to indicate traffic slowdowns.

In various embodiments, the mobile device may be configured to display any quantity of metrics or statistics about a navigation route including but not limited to an estimated time of arrival, travel distance remaining, average speed (overall or moving average), top speed, and/or other route statistics.

In various embodiments, the mobile device may be configured to display routes at different angles in order to accommodate the preferences of different users. Such viewing angles may include a birds eye view for two-dimensional maps to any of a variety of camera angles available for a three-dimensional map.

In various embodiments, the mobile device may be configured to provide navigation information other than map and routing information. For instance the mobile device may expose output from any of the hardware device described above with respect to FIG. 1. In one non-limiting example, an orientation sensor 168 may include a compass that outputs direction data. The mobile device described herein may be configured to display this directional data as a virtual compass, for example.

Environment Analysis Tool

FIGS. 4A-4E are a flowcharts depicting selected processing stages of embodiments of an environment analysis tool as implemented within a mobile device. The environment analysis tool may be invoked as part of an event handling routine for processing mapping application received on the mobile device, such as mobile device 300. The environment analysis tool may engage the services of Map Service 930 within the map service operating system as described in regard to FIG. 9.

The environment analysis tool may further communicate with circuitry related to processing various wireless signals and communicate with the mobile device operating system to modify the functionality of software routines related to processing the various wireless signals. The environment analysis tool may also receive information from sensors on the mobile device such as a gyroscope, an accelerometer, an orientation sensor, or any type of inertial sensor. Given that the sensors provide immediate data and are measured from the mobile device, the sensor data is not received from a remote source.

The sensors on the mobile device may provide the environment analysis tool with information on which to base a determination of an amount of movement in the absence of certain wireless signals such as GPS signals. Prior to entering a region in which signal quality is unreliable, the environment analysis tool may use the last known location of the mobile device according to the last reliable GPS data as a reference point and while in the region with unreliable signal quality, the environment analysis tool may rely on the sensors to determine when the region has been exited.

Figure 4A:
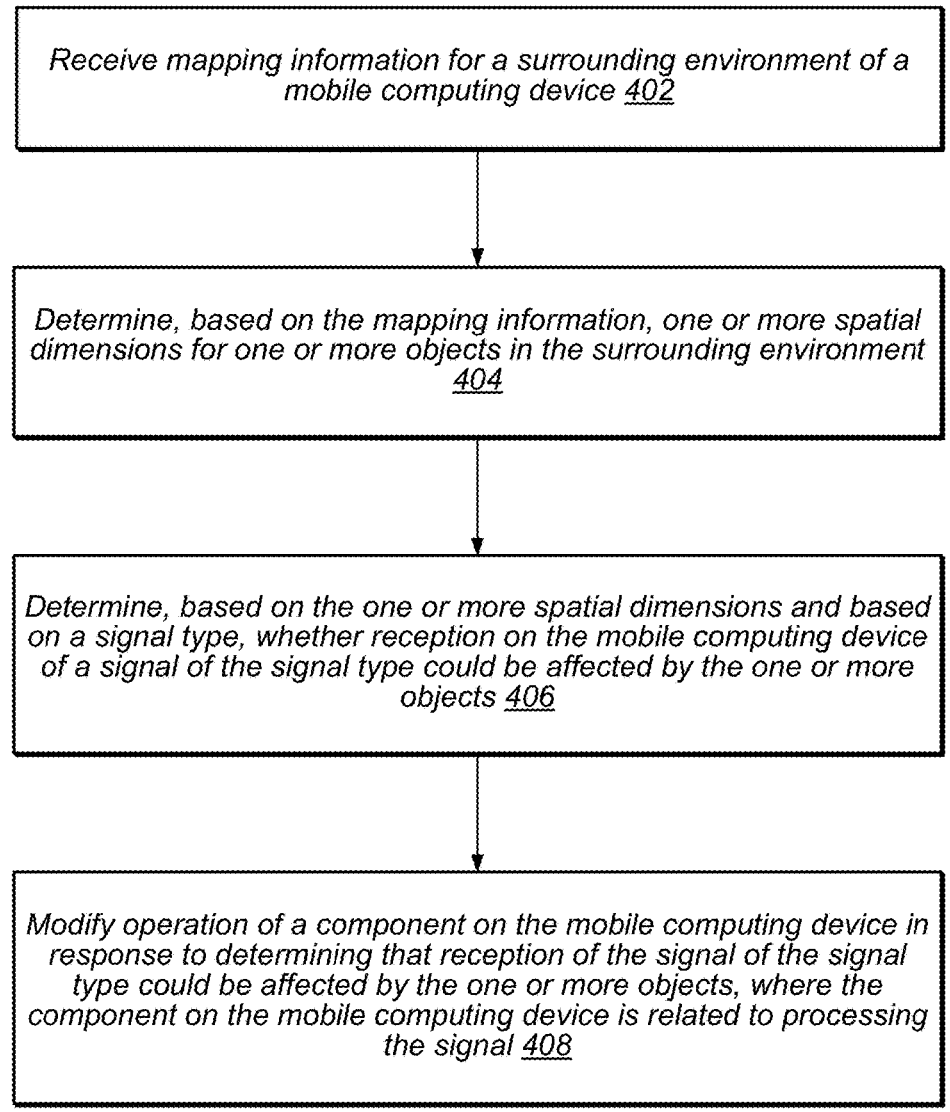
FIGS. 4A-4E depict example flowcharts corresponding to different embodiments of an environment analysis tool, according to some embodiments.

As per FIG. 4A, in some embodiments, an environment analysis tool may receive mapping information for a surrounding environment for a map region for a mobile computing device, as reflected in stage 402. This same mapping information may serve as the basis for a mapping application to generate and display a map view of the map region to a user. In some cases, the mapping information is vector data and not raster image data, or a combination of vector graphics data and raster image data. The mapping information may be received or requested from Map Service 930.

Figure 5:
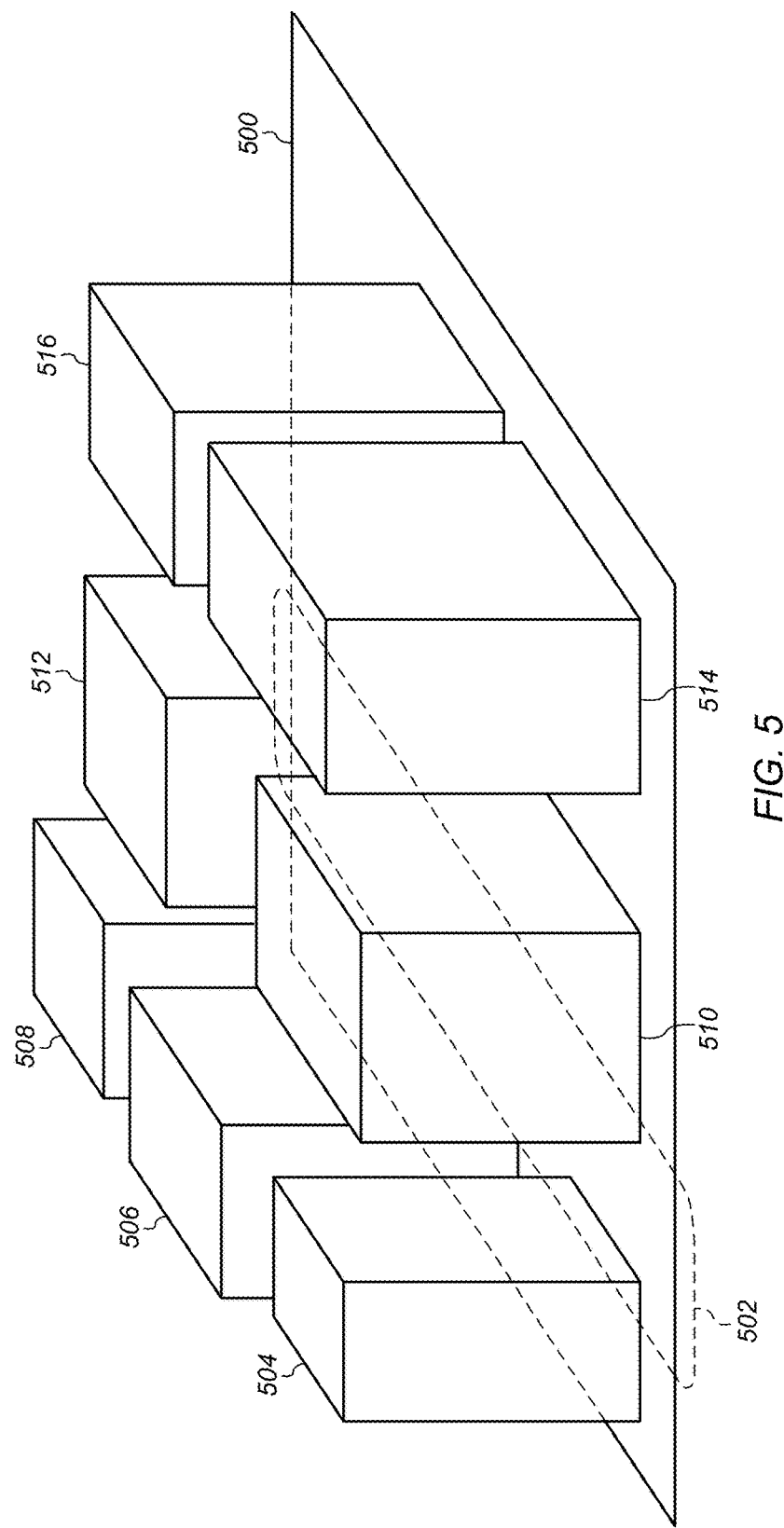
FIG. 5 depicts an illustration of a model of a surrounding environment, according to some embodiments.

Based on the mapping information, the environment analysis tool may determine one or more spatial dimensions for one or more objects in the surrounding environment as defined within the map region, as reflected in stage 404. For example, the environment analysis tool may receive three-dimensional mapping information for the map region from map service 930 or from GPS 940. The environment analysis tool may also receive, from map service 930 for example, two-dimensional mapping information that includes footprint information for buildings within the map region for which the three-dimensional mapping information corresponds. The map region may be any sized area of the surrounding environment. In some cases, the map region may be a region 500 as depicted within FIG. 5, and the determined spatial dimensions may correspond to the three-dimensional model as depicted by structures 504, 506, 508, 510, 512, 514, and 516 within FIG. 5.

The footprint information may include the location and dimensions of the physical perimeter boundaries of a given building within the map region. For example, in a simple case of a square building, the footprint may specify the locations of each corner of the building along with the length of each side of the building. In this example, if the square building has two stories and a flat roof, a simple cube may provide an accurate representation of the volume occupied by the building within the map region. Further, even with a rough approximation of a simple cube, the model may provide enough information to identify areas within the map region where a particular type of signal may be compromised or hard to receive, such as region 502 in FIG. 5. The environment analysis tool may determine, based on the size and location of the surrounding structures, that region 502 of FIG. 5 has the characteristics of an urban canyon. While the footprint in this example is a simple square, in general, the environment analysis tool may operate on any shape of footprint. Further, the footprint may be the footprint of any object within the map region.

Given a footprint and the area of the map region in which the footprint exists, and given three-dimensional information corresponding to the map region, the environment analysis tool may determine one or more height values for the footprint. The environment analysis tool may use one or more points within the footprint, or points proximate to the footprint, and correlate the one or more points to respective one or more height values from the three-dimensional mapping information, where each respective height value corresponds to a respective point. In this way, the environment analysis tool may determine a height value for each of the points in the footprint. A result is that the environment analysis tool, based on two different data sets of mapping information, determines one or more spatial dimensions for one or more objects in the map region, as reflected in stage 404. In this example, spatial dimensions are determined from the two-dimensional mapping information (footprints) and spatial dimensions are determined from the three-dimensional mapping information (height values).

In some embodiments, a footprint may be divided into multiple regions, and height values may be correlated to the three-dimensional information for one or more locations within each of the regions. For example, a building may be L-shaped, where one leg of the L is not as tall as the other leg of the L. In this case, the footprint may be divided into two regions, one region corresponding to each leg of the L, and a height value for each region may be used as the basis for extruding the footprint into three dimensional space. The regions of the footprint may be determined in other manners, such as uniform division of the footprint into any given number of regions, for example, dividing each footprint into quarters.

Once the environment analysis tool has identified one or more height values corresponding to one or more points in a given footprint, the environment analysis tool may generate a three-dimensional version of the footprint. The environment analysis tool may generate an entire three-dimensional model based on the three-dimensional versions of each object footprint in the map region. For example, the environment analysis tool may extrude or extend the object footprint into three-dimensional space based on the height value. The generated three-dimensional model has a higher level of granularity than the two-dimensional mapping information in that the three-dimensional model includes height values in addition to the footprint information. The generated three-dimensional model also has a lower level of granularity than the three-dimensional mapping information in that the three-dimensional model does not have as much detail regarding the dimensions of objects within the map region. In other words, in this example, the generated three-dimensional model has a different level of granularity from each of the sets of mapping information on which the three-dimensional model is based.

Based on one or more spatial dimensions of one or more objects in the generated three-dimensional model and based on considerations of a signal type, the environmental analysis tool may determine whether reception of the signal of the signal type could be affected by the one or more objects within a given area of the three-dimensional model, as reflected in stage 406. In some cases, to determine whether reception of the signal would be affected within a given area of the three-dimensional model the environment analysis tool determines whether characteristics of an urban canyon are present within the three-dimensional model, such as urban canyon 502 in FIG. 5.

Given a determination that a particular type of signal could be adversely affected given the mobile device's presence within a given region of the three-dimensional model, the environment analysis tool may responsively modify the operation of a component of the mobile device related to processing the particular type of signal, as reflected in stage 408. In other words, if a GPS signal is unreliably received while the mobile device is in say an urban canyon, then any efforts on the mobile device to find and use the GPS signal would be a waste of battery power and computational cycles. However, because the environment analysis tool response to entering an urban canyon may be to instruct the mobile device operating system to search less aggressively for a signal or to transition the circuitry related to processing the signal into a low-power mode, the mobile device conserves both battery power and computational cycles.

A similar determination, based on the three-dimensional model, may be made for a cellular signal, and the environment analysis tool may modify the operation of a process or circuitry related to processing the cellular signal.

In some embodiments, the environment analysis tool works in conjunction with a map tool, where a map tool may be responsible for using mapping information to render a map view of a map region. For example, in some cases, the map tool may generate a three-dimensional model from mapping information similar to the three-dimensional model described above constructed by the environment analysis tool. While the map tool may use the three-dimensional model for other purposes, the same model may be used by the environment analysis tool, thereby preventing the construction of two similar models and saving processing cycles. In such an embodiment, the environment analysis tool becomes dependent upon the processing of mapping information performed by the map tool, and therefore the environment analysis tool may analyze a model constructed by the map tool as the models are constructed.

As noted above, while the mobile device is within the region of the three-dimensional model determined to have poor signal reception, the environment analysis tool may rely on sensors within the mobile device to determine a current location within the three-dimensional model, or to at least determine an approximation of a current location. In this way, the environment analysis tool may again modify operation of any software processes or circuitry in response to the mobile device again having a higher quality signal reception. In this way, without having the mobile device searching and finding a GPS signal, the mobile device may transition the mobile device to again search for a GPS signal. In the same transition, the mobile device may change the power setting on circuitry for processing the GPS signal out of the low-power mode that was entered in response to entering the region with poor signal quality.

While transitioning into and out of a low-power mode is one possible response to entering a region with poor signal quality, other transitions are available. For example, instead of entering a low-power mode, the circuitry for processing the signal may be powered off altogether, or there may be multiple power modes that may be entered. Similarly, the operation of the operating system may be transitioned into different operating modes. For example, the operating system may search for the signal with a default frequency, and in response to entering the region with poor signal quality, the environment analysis tool may instruct the operating system to search for the signal with a lower frequency or to not search for the signal at all.

Figure 4B:
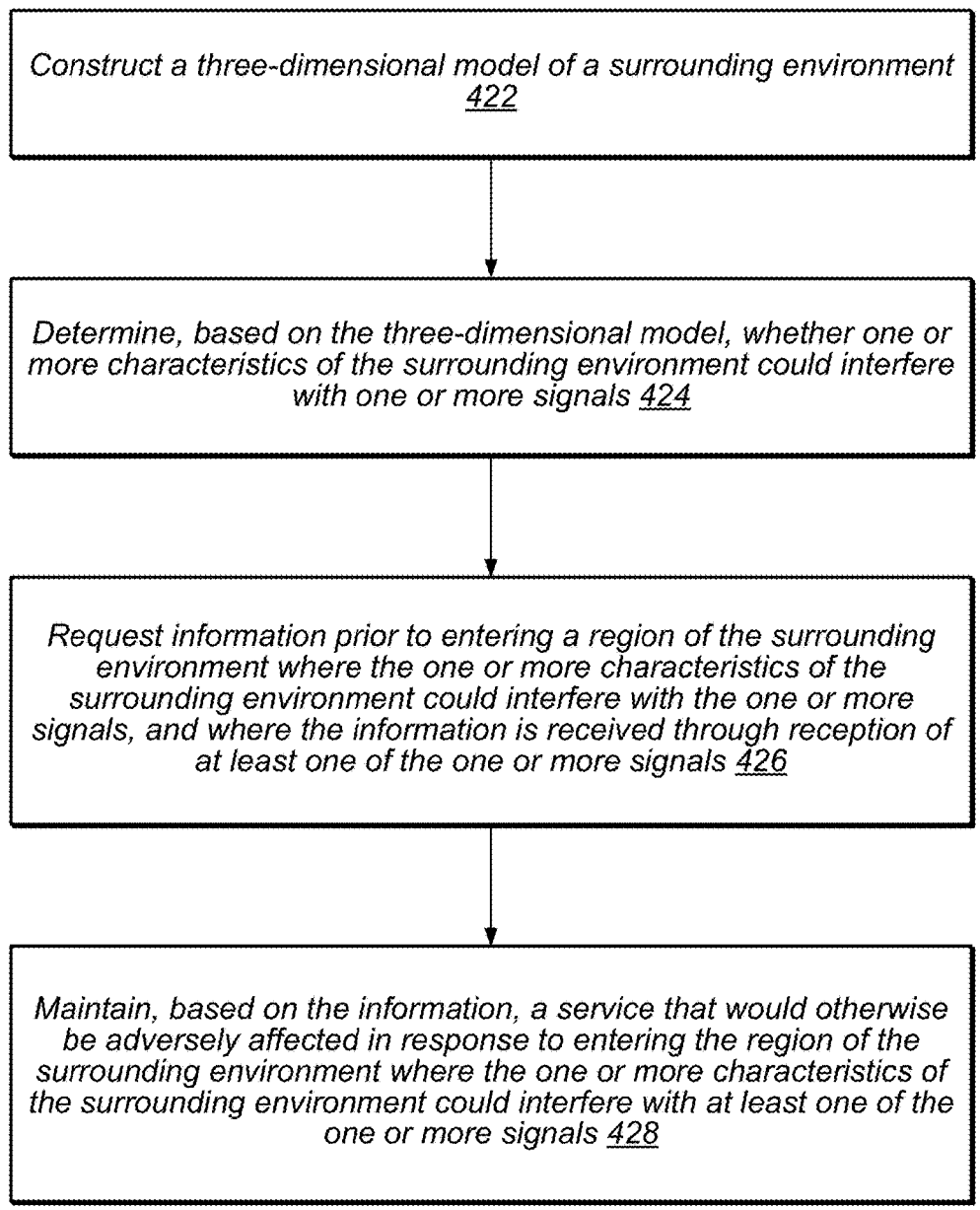

As per FIG. 4B, in some embodiments, the environment analysis tool may construct a three-dimensional model of a surrounding environment, as reflected in stage 422. Similar to the discussion above in regard to FIG. 4A, the environment analysis tool may construct the three-dimensional model based on mapping information for a current location or map region of the mobile device.

As reflected in stage 424, the environment analysis tool may determine, based on the three-dimensional model, whether one or more characteristics of the surrounding environment, such as structures or terrain, could interfere with one or more signals. For example, if a user of the mobile device is following a route to a destination, then based on a current location and trajectory, the environment analysis tool may determine that certain regions of the route are regions with poor signal quality. In some cases, the characteristic of the surrounding environment which may be a source of signal interference may be a tunnel. In other cases, the characteristic of the surrounding environment may be a large number of densely spaced buildings.

In response to determining the potential impending loss of signal, the environment analysis tool may request information prior to entering a region of the surrounding environment where there may be signal interference, as reflected in stage 426. For example, if the environment analysis tool determines that for the next three blocks of a city that there may be a loss of a GPS signal, the environment analysis tool may prefetch a quantity of GPS data sufficient to prevent loss or the minimize the drop in a current level of services, where the services may rely on the GPS data.

As reflected in stage 428, based on the prefetched information, the environment analysis tool is able to maintain a service or services that would otherwise be adversely affected in response to entering the region of poor signal quality within the surrounding environment.

In this embodiment, the constructed three-dimensional model may be constructed in a different manner than described above in regard to FIG. 4A, however, in either embodiment, either model construction process may be used. Given a location in a map, the environment analysis tool may request two-dimensional mapping information for the map. For example, the environment analysis tool may request from Map Service 930 mapping information including footprints for objects within the area indicated through the location in the map.

Given the location in the map region, the environment analysis tool may also request three-dimensional information for the map region. For example, the environment analysis tool may request from Map Service 930 mapping information that includes height values for various objects within the area indicated through the location in the map.

The environment analysis tool may then, similar to the process described above in regard to FIG. 4A, correlate a location or point in the footprint of an object in the map region with a height value from the three-dimensional mapping information. In some cases, one or more points in or proximate to the footprint may be correlated to respective height values. For example, height values for each corner of the footprint, or a points along the perimeter, or only a single height value for somewhere near the center of the footprint. In some cases, given multiple points within the footprint, the environment analysis tool may select the highest height value from the respective, corresponding height values. In other cases, the environment analysis tool may calculate an average height value from the multiple height values corresponding to the respective points in the footprint.

Similar to the creation of a three-dimensional model described above in regard to FIG. 4A, the environment analysis tool may extrude the footprint into three-dimensional space through the addition of a height value, or height values, or a height value based on multiple height values. In some cases, the environment analysis tool may represent the collection of extruded footprints within a data structure storing the defining information for each of the extruded footprints, in addition to information for where within the map region the given extruded footprint exists.

Given the generation of each extruded footprint, which is a three-dimensional object, the environment analysis tool may have available a three-dimensional model on which to base determinations of potential signal interference based on characteristics of the surrounding environment.

Figure 4C:
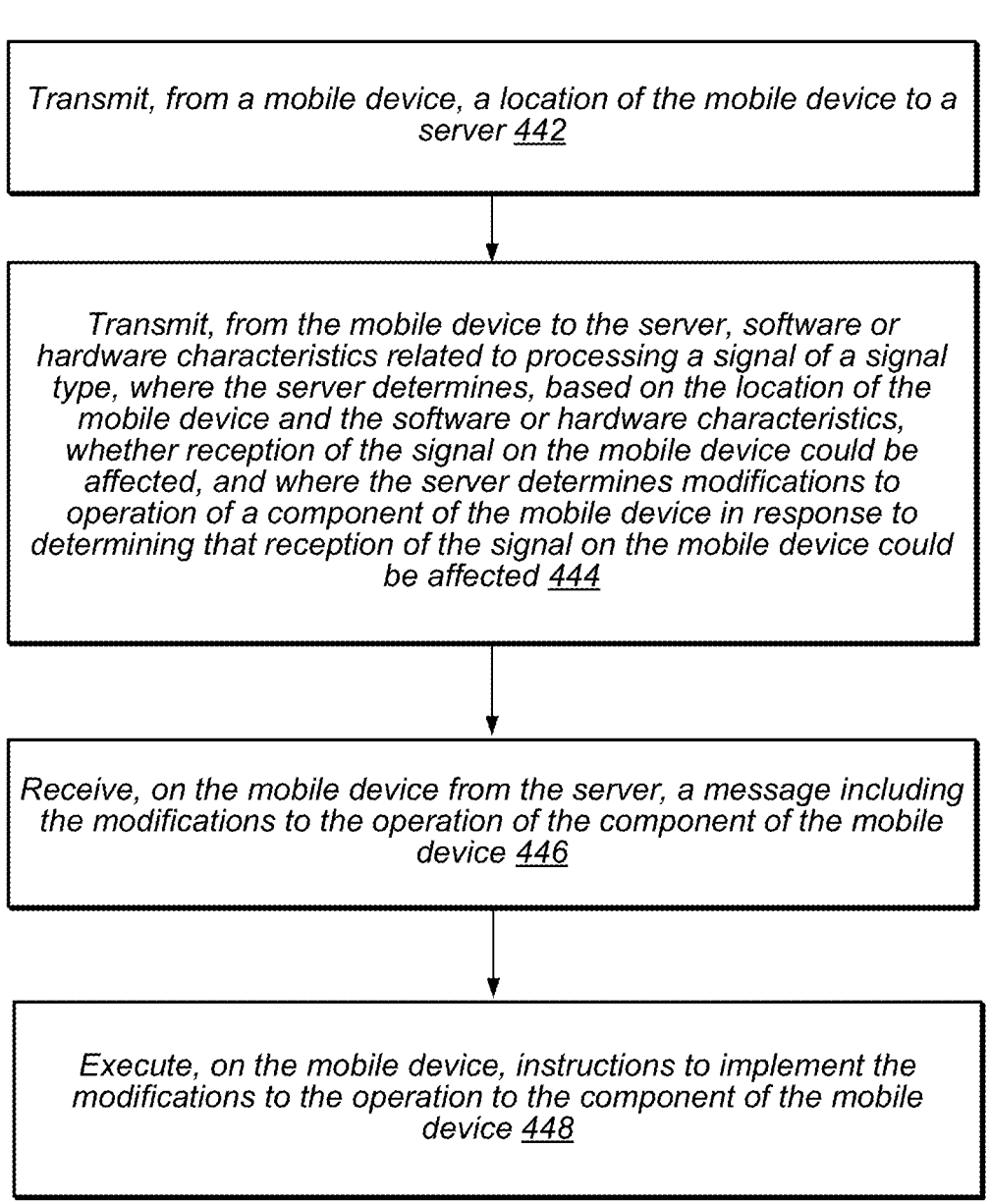

As per FIG. 4C, in some embodiments, the environment analysis tool on a mobile device may communicate with a remote system such as a server to determine whether to or when to modify operations of the mobile device in response to a potential loss of signal quality.

In this case, the environment analysis tool on the mobile device may transmit a current location for the mobile device to a server, as reflected in stage 442. The environment analysis tool may also transmit a model type for the mobile device or the hardware and/or software characteristics of the mobile device related to processing a signal of a particular signal type. These transmitted characteristics may be relevant given that different types of mobile devices may be better or more poorly equipped to detect or receive signals. The server receiving the transmission from the mobile device may then perform a determination similar to that described above in regard to FIGS. 4A and 4B in order to determine, based on the location of the mobile device, or the software and/or hardware characteristics, whether reception of the signal on the mobile device may be affected within a soon to be entered region, as reflected in stage 444. The server may further determine the modifications that reception of the operation of a component of the mobile device to be performed in response to the mobile device entering the region of poor signal quality, as also reflected in stage 444.

Given the determinations regarding signal quality and modifications to operation of the component of the mobile device, the server may transmit to the mobile device a message including the modifications to the operation of the mobile device. The receipt of the transmitted message from the server on the mobile device is reflected in stage 446.

The message from the server may further include instructions to not implement the modifications until attempts to receive the signal are met with diminished success. In other cases, the message from the server may include instructions to not implement the modifications until the region with poor signal quality is entered. In either case, the mobile device may at some point execute instructions to implement the modifications to the operation of the component of the mobile device as indicated within the message received from the server, as reflected in stage 448.

In some cases, the mobile device may provide the server with updated information on a current location, and the server may repeat the above process for determining whether the mobile device should modify operations related to processing the signal. Upon determining, based on the updated location information, that the mobile device is outside of a region with poor signal quality, the sever may transmit to the mobile device a message with new instructions for modifying operation to reflect to the availability of a stronger signal. In some cases, the instructions to the mobile device are to return the state of processing and/or circuitry to the state prior to entering the region of poor signal quality.

Figure 4D:
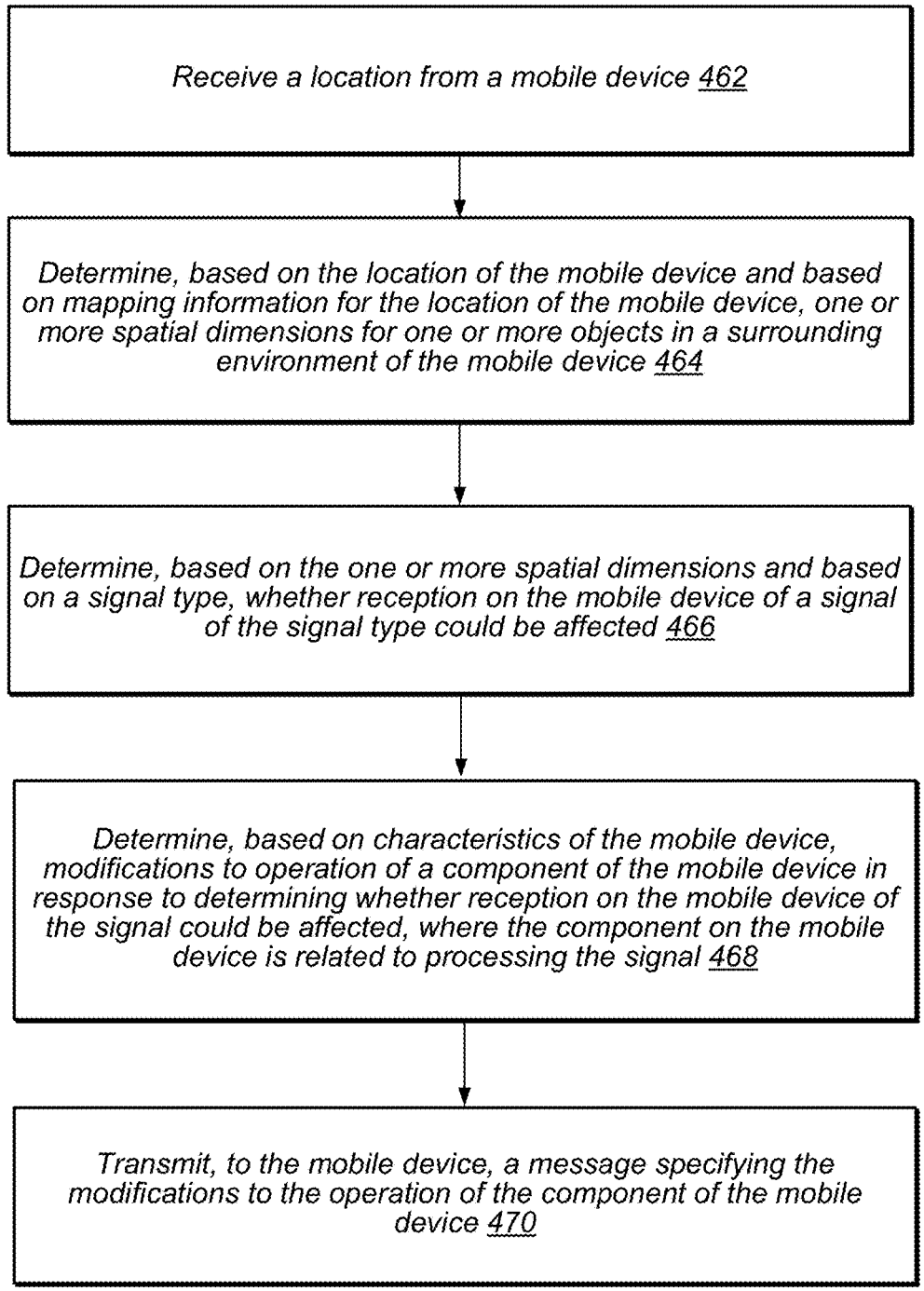

As per FIG. 4D, a process similar to that described above in regard to FIG. 4C is presented, however, instead of the perspective of the mobile device, the perspective in the process of FIG. 4D is from the server. As reflected in stage 462, a server may receive location information from a mobile device. Given the location of the mobile device, the server may determine, based on the location, one or more spatial dimensions for one or more objects in the surrounding environment of the mobile device, as reflected in stage 464. The construction of a model of the three-dimensional space corresponding to the surrounding environment may be performed similarly as described above in regard to FIGS. 4A and 4B.

Based on the one or more spatial dimensions of one or more objects within the model and based on a signal type, the server may determine whether reception on the mobile device of the signal type may be affected, as reflected in stage 466. For example, in the case of a GPS signal, without a line of sight from the mobile device to one of the GPS satellites, reception of the GPS signal may be diminished. If the model of the surrounding environment indicates that enough buildings of sufficient height would obstruct a line of sight given a location of the mobile device, the server may determine that signal quality received on the mobile device may be impaired.

The determination of whether reception on the mobile device of the signal of the particular signal type is affected may depend on characteristics of the mobile device, such as the model or class of hardware and capabilities for the model or class. Based on the characteristics of the mobile device, the map tool may determine one or more modifications to operation of a component of the mobile device in response to the determination that reception on the mobile device of the signal could be affected, where the component on the mobile device is related to processing the signal, as reflected in stage 468.

Given a determination based on mobile device characteristics, the signal type, and the spatial characteristics of the model of the surrounding environment, the server may then create and transmit a message specifying the modifications to the operations of one or more components on the mobile device in order for the mobile device to save power or computation cycles, as reflected in stage 470.

In some cases, applicable to processing performed on a server and a mobile device, a determination may be made as to a level of interference which may be expected for a signal within a region of a surrounding environment. In other words, some urban canyons may be worse than others. In such a case, a determination may be made resulting in one of a spectrum of options for modifying operations on a mobile device related to handling the signal. For example, if an urban canyon is determined to be mildly disruptive, then the mobile device may not diminish power levels or processing levels to the extent if the urban canyon were determined to be extremely disruptive. In some cases, a frequency level for searching for a signal may be lower for more disruptive regions of a surrounding environment than a frequency level for a less disruptive region of the surrounding environment. Similarly for other signals and other options for modifying processing related to the other signals.

In addition to the above methods for constructing a three-dimensional model of a surrounding environment, the server may also construct a model based on a different method. In some embodiments, the environment analysis tool may begin with the creation of a representation of map region, where the representation is divided into segments defined in terms of two-dimensional space. For example, the map area may correspond to a 200 square meter area, and each segment may be defined to correspond to a square meter. In other cases, segments may be defined in terms of other shapes.

The environment analysis tool may then use three-dimensional mapping information for the map, where the three-dimensional mapping information includes height values corresponding to at least one point in each segment location. The environment analysis tool may then correlate a respective height value to each of the respective segments. In some cases, for a given segment, the environment analysis tool may correlate a height value from the center of the segment and for a point along each side of the segment.

Given the segments and respective height values, the environment analysis tool may generate a three-dimensional version of the segment through the addition of a respective height value to a respective segment. In this way, the environment analysis tool creates an extruded version of the two-dimensional segment. This process may be repeated for each segment.

At this point, the environment analysis tool has generated a model with multiple segments of varying heights and may use this model as the basis for determining whether or not a region of the surrounding environment may be a region of poor signal quality.

Figure 4E:
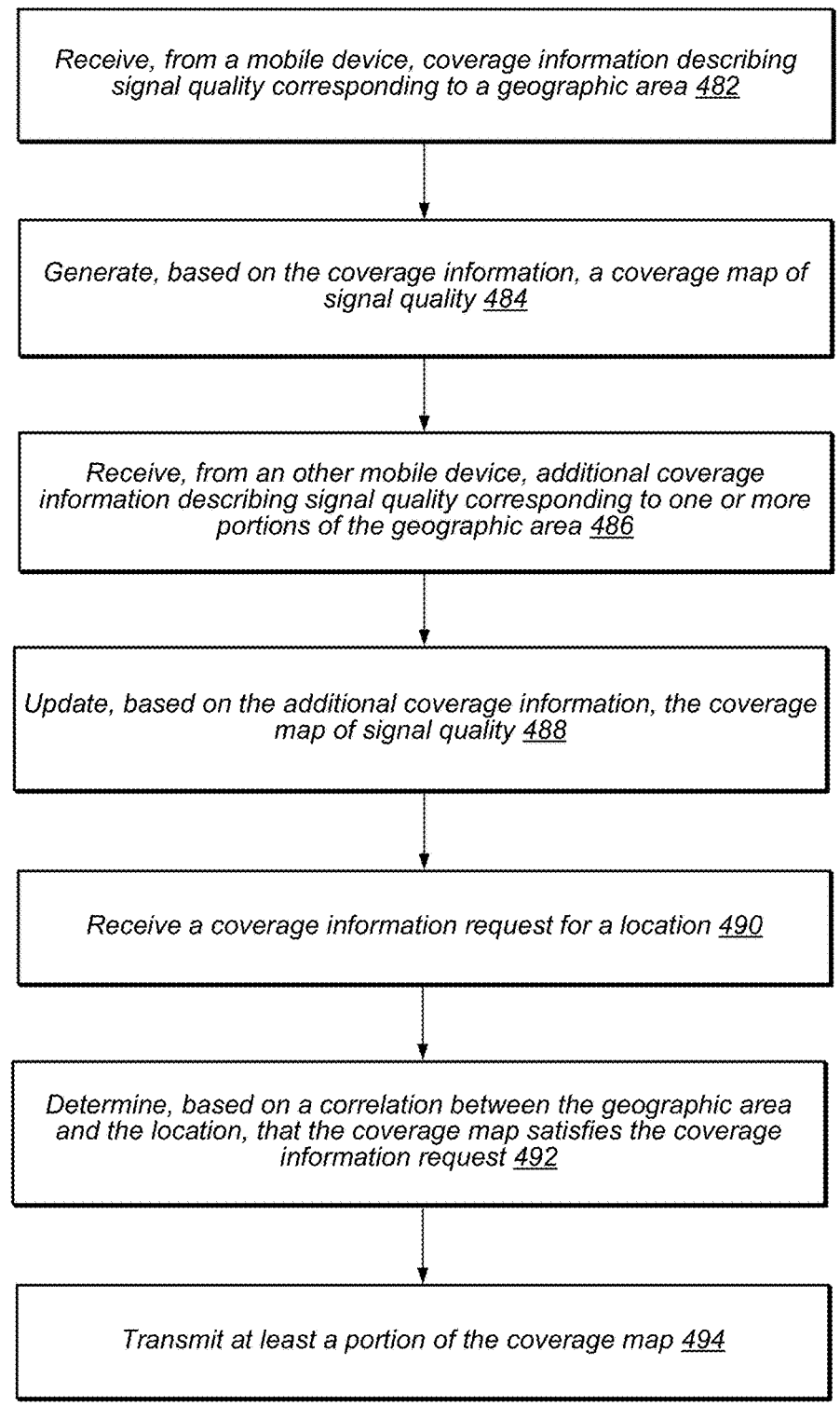

As per FIG. 4E, in some embodiments, the environment analysis tool may determine whether or not a signal in a given region may suffer from poor quality based on crowd-sourced information. In other words, a server may receive information from a variety of different mobile devices pertaining to a given location or a given region, and based on the aggregated information, the server may create a heat map or a coverage map reflective of the signal quality in the given location or region. In some cases, this coverage map is not based on a calculation of characteristics of a surrounding environment and is only based on information collected from mobile devices.

As reflected in stage 482, a server may receive coverage information from a mobile device, where the coverage information describes signal quality corresponding to a certain location or geographic area. In some cases, based on reduced success in receiving the signal, the environment analysis tool on a mobile device may determine the location at which the signal quality deteriorated. In some cases, the mobile device may also record the extent of the geographic area in which the signal quality is poor along with the extent of the degradation of the signal. The mobile device may then transmit this coverage information to a server.

The server, based on the coverage information received from one or multiple devices may generate a coverage map of signal quality, as reflected in stage 484. While a coverage map may be based on information from a single mobile device, in most cases, the accuracy and reliability of the coverage map improves with coverage information from a greater number of mobile devices.

As the server receives coverage information from additional mobile devices describing signal quality corresponding to one or more portions of a geographic area, the server may update the coverage map to reflect the additional coverage information, as reflected in stage 486. This update process may include averaging signal strength values, or adjusting a region in which a signal is received with poor quality. In some cases, the update process may eliminate certain sources of information with information far enough outside the average. The update of the coverage map for a given area is reflected in stage 488.

At some point, the server may receive a request from a mobile device for a coverage map, as reflected at stage 490. This request may include information regarding a model or hardware or software characteristics in addition to information regarding the location and/or trajectory of the mobile device. The server, based on a correlation between the geographic area of a coverage map and the location of the mobile device, may determine a corresponding coverage map or portion of a coverage map that satisfies the request, as reflected at stage 492.

The determination of an appropriate coverage map may further depend on the characteristics of the mobile device. In other words, some devices may be better at receiving certain types of signals and the corresponding coverage map will be different than a device with poorer capabilities of receiving the same type of signals, and the server may keep different coverage maps for each of the different classes of mobile device.

Upon a determination of an appropriate coverage map, the server may then transmit at least a portion of the coverage map to the mobile device as requested, and as reflected at stage 494. The mobile device may then use the coverage map similarly to how the mobile devices described above in regard to FIGS. 4A and 4B use the constructed models to determine whether or not to modify operations on the mobile device related to receiving and/or processing the signal for which a coverage map corresponds. Further, the server may use the coverage may to provide instructions to a mobile device instead of a model similar to the methods described above in FIGS. 4C and 4D.

Environment Analysis Tool Module

Figure 6:
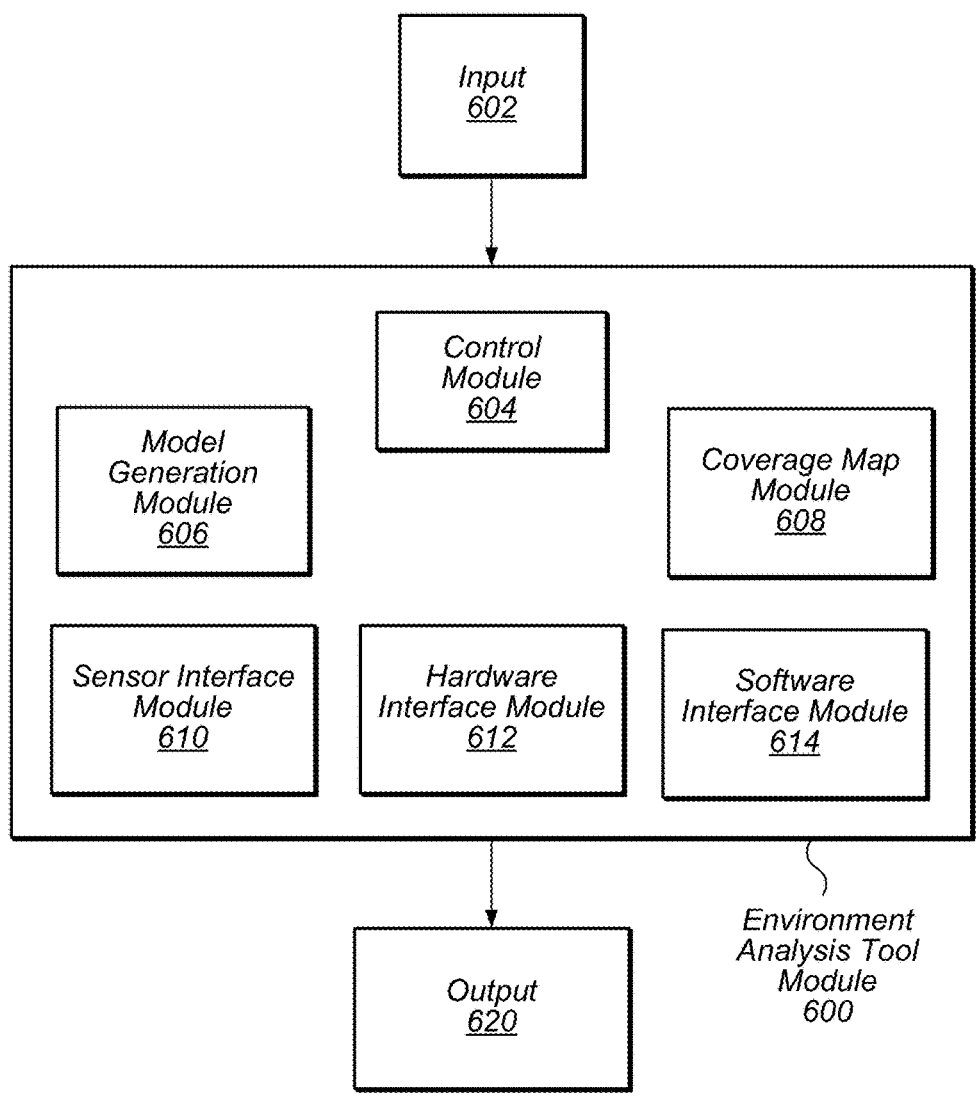
FIG. 6 illustrates an environment analysis tool module, according to some embodiments.

FIG. 6 illustrates an embodiment of an Environment Analysis Tool Module 600. As noted above, the Environment Analysis Tool Module 600 may implemented a variety of different embodiments of an environment analysis tool.

In some embodiments, Control Module 604 may receive Input 602, which may be various types of mapping information or coverage map information, as described above with respect to FIGS. 4A-4E. Given mapping information, Control Module 604 may invoke Model Generation Module 606 to generate a model of the surrounding environment, according to various embodiments discussed above. Given a coverage map, Control Module 604 may invoke Coverage Map Module 608 to make determinations regarding the surrounding environment, according to various embodiments discussed above.

Given a model of the surrounding environment or a coverage map, Control Module 604 may invoke Sensor Interface Module 610, Hardware Interface Module 612, or Software Interface Module 614. In some cases, depending on the input, Environment Analysis Tool Module 600 may communicate with Map Service 930 to request or receive mapping information.

Depending on the embodiment and current state, Control Module 604 may provide as output 620 different instructions. For example, given a determination to modify operation of circuitry related to processing a given signal, Hardware Interface Module 612 may output instructions for setting the circuitry to a new state. Similarly, given a determination to modify operation of a software process related to processing a given signal, Software Interface Module may communication with a process in the operation system of the mobile device to implement the modification to processing the signal. Further, as described above, the environment analysis tool may communicate with various sensors on the mobile device to determine, for example, an updated location, and in such a case, the Sensor Interface Module 610 may collect the sensor data.

Cloud Computing Environment

Figure 8:
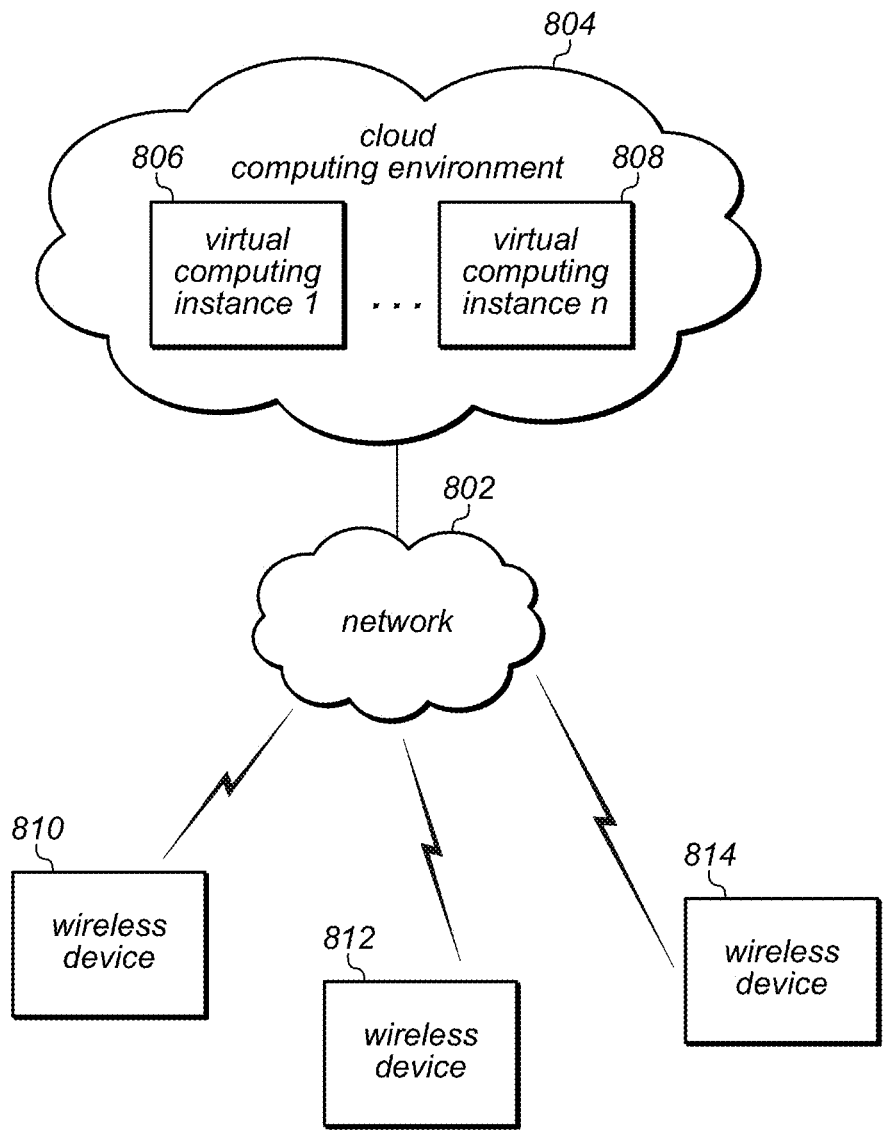
FIG. 8 depicts an illustration of a cloud computing environment that may be used in some embodiments of the environment analysis tool.

FIG. 8 depicts one possible computing environment that includes wireless devices 810, 812, and 814 accessing a cloud computing environment 804 over network 802. In this example, a wireless device may access any implementation or portion of an implementation of any of the above-discussed embodiments of an environment analysis tool, where the environment analysis tool or portions of the environment analysis tool execute within one of the virtual computing instances 806 through 808. For example, the creation of a model of the surrounding environment may be performed on one of the virtual computing instances.

Further, in the embodiment described above in regard to FIG. 4E, instead of a server handling the collection of coverage map information, the elements performed by the server may be similarly performed by the cloud computing environment depicted within FIG. 8

Example Computer System

Figure 7:
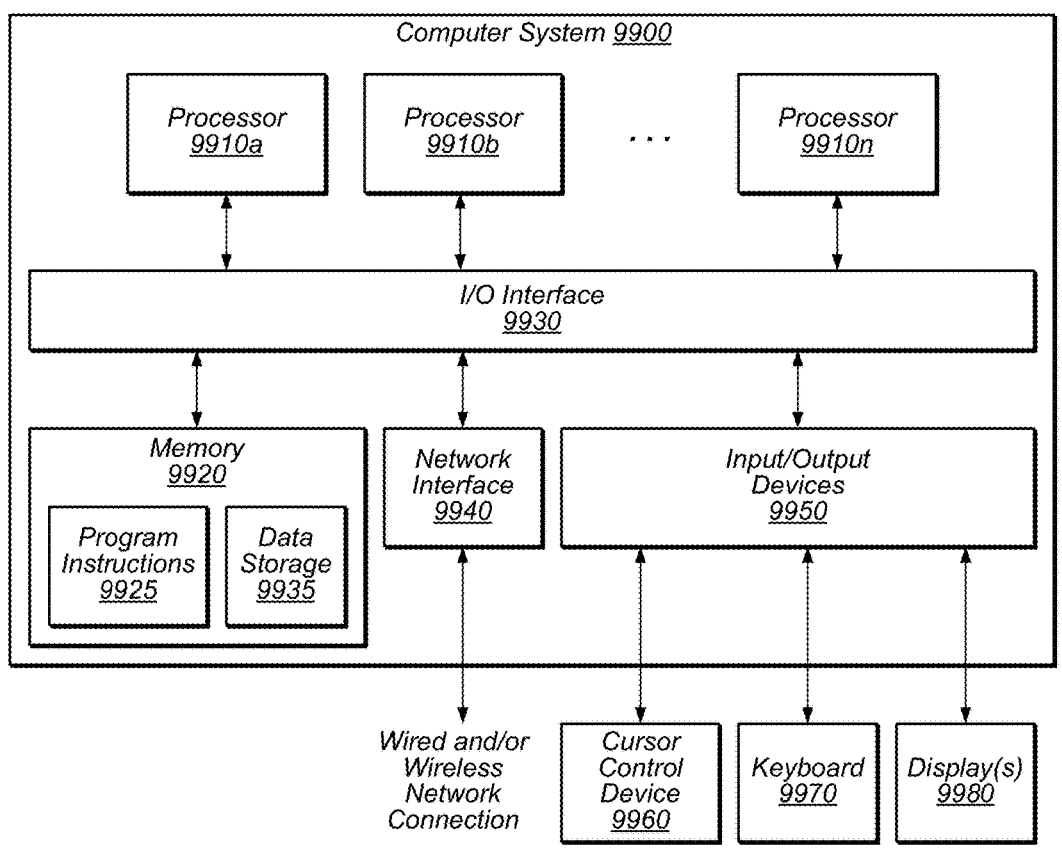
FIG. 7 depicts elements of an example computer system capable of implementing an environment analysis tool.

FIG. 7 illustrates computer system 9900 that may execute the embodiments discussed above. In different embodiments, the computer system may be any of various types of devices, including, but not limited to, a personal computer system, desktop computer, laptop, notebook, or netbook computer, mainframe computer system, handheld computer, workstation, network computer, a camera, a set top box, a mobile device, a consumer device, video game console, handheld video game device, application server, storage device, a television, a video recording device, a peripheral device such as a switch, modem, router, or in general any type of computing or electronic device.

In one embodiment, computer system 9900 includes one or more processors 9910*a*-9910*n* coupled to system memory 9920 via input/output (I/O) interface 9930. The computer system further includes network interface 9940 coupled to I/O interface 9930, and one or more input/output devices 9950, such as cursor control device 9960, keyboard 9970, and one or more displays 9980. In some embodiments, it is contemplated that embodiments may be implemented using a single instance of a computer system, while in other embodiments may be implemented on multiple such systems, or multiple nodes making up a computer system, may be configured to host different portions or instances of embodiments. For example, in one embodiment some elements may be implemented via one or more nodes of the computer system that are distinct from those nodes implementing other elements.

In various embodiments, the computer system may be a uniprocessor system including one processor, or a multiprocessor system including several processors (e.g., two, four, eight, or another suitable number). The processors may be any suitable processor capable of executing instructions. For example, in various embodiments, the processors may be general-purpose or embedded processors implementing any of a variety of instruction set architectures (ISAs), such as the x86, PowerPC, SPARC, or MIPS ISAs, or any other suitable ISA. In multiprocessor systems, each of processors may commonly, but not necessarily, implement the same ISA.

In some embodiments, at least one processor may be a graphics processing unit. A graphics processing unit or GPU may be considered a dedicated graphics-rendering device for a personal computer, workstation, game console or other computing or electronic device. Modern GPUs may be very efficient at manipulating and displaying computer graphics, and their highly parallel structure may make them more effective than typical CPUs for a range of complex graphical algorithms. For example, a graphics processor may implement a number of graphics primitive operations in a way that makes executing them much faster than drawing directly to the screen with a host central processing unit (CPU). In various embodiments, the content object processing methods disclosed herein may, at least in part, be implemented with program instructions configured for execution on one of, or parallel execution on two or more of, such GPUs. The GPU(s) may implement one or more application programmer interfaces (APIs) that permit programmers to invoke the functionality of the GPU(s). Suitable GPUs may be commercially available from vendors such as NVIDIA Corporation, ATI Technologies (AMD), and others.

System memory within the computer system may be configured to store program instructions and/or data accessible from a processor. In various embodiments, the system memory may be implemented using any suitable memory technology, such as static random access memory (SRAM), synchronous dynamic RAM (SDRAM), nonvolatile/Flash-type memory, or any other type of memory. In the illustrated embodiment, program instructions and data may implement desired functions, such as those described above for the various embodiments are shown stored within system memory 9920 as program instructions 9925 and data storage 9935, respectively. In other embodiments, program instructions and/or data may be received, sent or stored upon different types of computer-accessible media or on similar media separate from system memory or the computer system. Generally, a computer-accessible medium may include storage media or memory media such as magnetic or optical media, e.g., disk or CD/DVD-ROM coupled to the computer system via the I/O interface. Program instructions and data stored via a computer-accessible medium may be transmitted from transmission media or signals such as electrical, electromagnetic, or digital signals, which may be conveyed via a communication medium such as a network and/or a wireless link, such as may be implemented via the network interface.

In one embodiment, the I/O interface may be configured to coordinate I/O traffic between the processor, the system memory, and any peripheral devices in the device, including a network interface or other peripheral interfaces, such as input/output devices. In some embodiments, the I/O interface may perform any necessary protocol, timing or other data transformations to convert data signals from one component into a format suitable for another component to use. In some embodiments, the I/O interface may include support for devices attached through various types of peripheral buses, such as a variant of the Peripheral Component Interconnect (PCI) bus standard or the Universal Serial Bus (USB) standard, for example. In some embodiments, the function of the I/O interface may be split into two or more separate components, such as a north bridge and a south bridge, for example. In addition, in some embodiments some or all of the functionality of the I/O interface, such as an interface to system memory, may be incorporated directly into the processor.

The network interface of the computer system may be configured to allow data to be exchanged between the computer system and other devices attached to a network, such as other computer systems, or between nodes of the computer system. In various embodiments, the network interface may support communication via wired or wireless general data networks, such as any suitable type of Ethernet network, for example; via telecommunications/telephony networks such as analog voice networks or digital fiber communications networks; via storage area networks such as Fibre Channel SANs, or via any other suitable type of network and/or protocol.

The I/O devices may, in some embodiments, include one or more display terminals, keyboards, keypads, touchpads, scanning devices, voice or optical recognition devices, or any other devices suitable for entering or retrieving data from one or more computer systems. Multiple I/O devices may be present in the computer system or may be distributed on various nodes of the computer system. In some embodiments, similar I/O devices may be separate from the computer system and may interact with one or more nodes of the computer system through a wired or wireless connection, such as over the network interface.

The memory within the computer system may include program instructions configured to implement each of the embodiments described herein. In one embodiment, the program instructions may include software elements of embodiments of the modules discussed earlier. The data storage within the computer system may include data that may be used in other embodiments. In these other embodiments, other or different software elements and data may be included.

Those skilled in the art will appreciate that the computer system is merely illustrative and is not intended to limit the scope of the embodiments described herein. In particular, the computer system and devices may include any combination of hardware or software that can perform the indicated functions, including a computer, personal computer system, desktop computer, laptop, notebook, or netbook computer, mainframe computer system, handheld computer, workstation, network computer, a camera, a set top box, a mobile device, network device, internet appliance, PDA, wireless phones, pagers, a consumer device, video game console, handheld video game device, application server, storage device, a peripheral device such as a switch, modem, router, or in general any type of computing or electronic device. The computer system may also be connected to other devices that are not illustrated, or instead may operate as a standalone system. In addition, the functionality depicted within the illustrated components may in some embodiments be combined in fewer components or distributed in additional components. Similarly, in some embodiments, the functionality of some of the illustrated components may not be provided and/or other additional functionality may be available.

Those skilled in the art will also appreciate that, while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computer system via inter-computer communication. Some or all of the system components or data structures may also be stored (e.g., as instructions or structured data) on a computer-accessible medium or a portable article to be read from an appropriate drive, various examples of which are described above. In some embodiments, instructions stored on a computer-accessible medium separate from the computer system may be transmitted via transmission media or signals such as electrical, electromagnetic, or digital signals, conveyed via a communication medium such as a network and/or a wireless link. Various embodiments may further include receiving, sending or storing instructions and/or data implemented in accordance with the foregoing description upon a computer-accessible medium. Accordingly, the present invention may be practiced with other computer system configurations.

CONCLUSION

Various embodiments may further include receiving, sending or storing instructions and/or data implemented in accordance with the foregoing description upon a computer-accessible medium. Generally, a computer-accessible medium may include storage media or memory media such as magnetic or optical media such as disks or DVD/CD-ROM, volatile or non-volatile media such as RAM, ROM, flash drives, as well as transmission media or signals such as electrical, electromagnetic, or digital signals, conveyed via a communication medium such as network and/or a wireless link.

The various methods described herein represent example embodiments of methods. These methods may be implemented in software, hardware, or through a combination of hardware and software. The order of the method steps may be changed, and various elements may be added, reordered, combined, omitted, or modified.

Various modifications and changes may be made as would be obvious to a person skilled in the art having the benefit of this disclosure. It is intended that the invention embrace all such modifications and changes and, accordingly, the above description to be regarded in an illustrative rather than a restrictive sense.

What is claimed is:
1. A method, comprising:
performing, by a mobile computing device:
receiving mapping information for a surrounding environment of the mobile computing device;
determining, based on height values included in the mapping information, one or more spatial dimensions for one or more particular objects in the surrounding environment;
determining, based on analyzing the one or more spatial dimensions for the one or more particular objects with respect to a signal type, whether reception on the mobile computing device of a signal of the signal type could be affected by the one or more particular objects; and
modifying operation of a component on the mobile computing device in response to said determining that reception of the signal of the signal type could be affected by the one or more particular objects, wherein the component on the mobile computing device is related to processing the signal, and wherein the operation of the component on the mobile device is modified to search less frequently for the signal or the operation of the component on the mobile device is modified to operate in a low-power mode.

2. The method of claim 1, wherein the mapping information comprises two-dimensional mapping information, wherein the mapping information comprises three-dimensional mapping information, and wherein the mapping information comprises vector graphics data for rendering on the mobile computing device.

3. The method of claim 1, wherein the mapping information comprises two-dimensional mapping information and three-dimensional mapping information, and wherein said determining the one or more spatial dimensions for one or more particular objects comprises:
 generating a model of the surrounding environment, wherein said generating comprises:
  identifying a footprint of an object of the one or more particular objects from the two-dimensional mapping information;
  correlating the footprint to a corresponding area in the three-dimensional mapping information to find a height value;
  determining, based on the height value, one of the one or more spatial dimensions;
  extruding the footprint to the height value; and
  repeating said identifying, said correlating, said determining, and said extruding for each of the one or more particular objects.

4. The method of claim 3, wherein said determining whether reception of a signal of the signal type is affected comprises determining that the model comprises an urban canyon.

5. The method of claim 4, wherein said modifying the operation of the component of the mobile computing device further comprises modifying the operation of the component of the mobile computing device to search less frequently for the signal while inside of the urban canyon.

6. The method of claim 4, wherein said modifying the operation of the component of the mobile computing device further comprises modifying the operation of the component of the mobile computing device to operate circuitry for processing the signal in a low-power mode while inside of the urban canyon.

7. The method of claim 6, further comprising:
 determining, based on sensor data, when the urban canyon has been exited, wherein the sensor data is collected from the mobile computing device; and
 in response to determining when the urban canyon has been exited, transitioning the circuitry for processing the signal out of the low-power mode.

8. The method of claim 5, further comprising:
 determining, based on sensor data, when the urban canyon has been exited, wherein the sensor data is not received from a remote source; and
 in response to determining when the urban canyon has been exited, searching more frequently for the signal.

9. A non-transitory computer-readable storage medium storing program instructions, wherein the program instructions are executable on a mobile computing device to implement:
 receiving mapping information for a surrounding environment of the mobile computing device;
 determining, based on height values included in the mapping information, one or more spatial dimensions for one or more particular objects in the surrounding environment;
 determining, based on analyzing the one or more spatial dimensions for the one or more particular objects with respect to a signal type, whether reception on the mobile computing device of a signal of the signal type could be affected by the one or more particular objects; and
 modifying operation of a component on the mobile computing device in response to said determining that reception of the signal of the signal type could be affected by the one or more particular objects,
  wherein the component on the mobile computing device is related to processing the signal, and
  wherein the operation of the component on the mobile computing device is modified to search less frequently for the signal or the operation of the component on the mobile device is modified to operate in a low-power mode.

10. The non-transitory computer-readable storage medium of claim 9, wherein the mapping information comprises two-dimensional mapping information, wherein the mapping information comprises three-dimensional mapping information, and wherein the mapping information comprises vector graphics data for rendering on the mobile computing device.

11. The non-transitory computer-readable storage medium of claim 9, wherein the mapping information comprises two-dimensional mapping information and three-dimensional mapping information, and wherein said determining the one or more spatial dimensions for one or more particular objects comprises:
 generating a model of the surrounding environment, wherein said generating comprises:
  identifying a footprint of an object of the one or more particular objects from the two-dimensional mapping information;
  correlating the footprint to a corresponding area in the three-dimensional mapping information to find a height value;
  determining, based on the height value, one of the one or more spatial dimensions;
  extruding the footprint to the height value; and
  repeating said identifying, said correlating, said determining, and said extruding for each of the one or more particular objects.

12. The non-transitory computer-readable storage medium of claim 11, wherein said determining whether reception of a signal of the signal type is affected comprises determining that the model comprises an urban canyon.

13. The non-transitory computer-readable storage medium of claim 12, wherein said modifying the operation of the component of the mobile computing device further comprises modifying the operation of the component of the mobile device to search less frequently for the signal while inside of the urban canyon.

14. The non-transitory computer-readable storage medium of claim 12, wherein said modifying the operation of the component of the mobile computing device further comprises modifying the operation of the component of the mobile computing device to operate circuitry for processing the signal in a low-power mode while inside of the urban canyon.

15. The non-transitory computer-readable storage medium of claim 14, wherein the program instructions are further executable by the mobile computing device to perform:

determining, based on sensor data, when the urban canyon has been exited, wherein the sensor data is collected from the mobile computing device; and in response to determining when the urban canyon has been exited, transitioning the circuitry for processing the signal out of the low-power mode.

16. The non-transitory computer-readable storage medium of claim 13, wherein the program instructions are further executable by the mobile computing device to perform:

determining, based on sensor data, when the urban canyon has been exited, wherein the sensor data is not received from a remote source; and in response to determining when the urban canyon has been exited, searching more frequently for the signal.

17. A system, comprising:

a mobile device comprising at least one processor; and a memory comprising program instructions, wherein the program instructions are executable by the at least one processor to perform:

receiving mapping information for a surrounding environment of the mobile device;

determining, based on height values included in the mapping information, one or more spatial dimensions for one or more particular objects in the surrounding environment;

determining, based on analyzing the one or more spatial dimensions for the one or more particular objects with respect to a signal type, whether reception on the mobile device of a signal of the signal type could be affected by the one or more particular objects; and modifying operation of a component on the mobile device in response to said determining that reception of the signal of the signal type could be affected by the one or more particular objects, wherein the component on the mobile device is related to processing the signal, and wherein the operation of the component on the mobile device is modified to search less frequently for the signal or the operation of the component on the mobile device is modified to operate in a low-power mode.

18. The system of claim 17, wherein the mapping information comprises two-dimensional mapping information, wherein the mapping information comprises three-dimensional mapping information, and wherein the mapping information comprises vector graphics data for rendering on the mobile device.

19. The system of claim 17, wherein the map information comprises two-dimensional map information and three-dimensional map information, and wherein said determining the one or more spatial dimensions for one or more particular objects comprises:

generating a model of the surrounding environment, wherein said generating comprises:

identifying a footprint of an object of the one or more particular objects from the two-dimensional mapping information;

correlating the footprint to a corresponding area in the three-dimensional mapping information to find a height value;

determining, based on the height value, one of the one or more spatial dimensions;

extruding the footprint to the height value; and repeating said identifying, said correlating, said determining, and said extruding for each of the one or more particular objects.

20. The system of claim 19, wherein said determining whether reception of a signal of the signal type is affected comprises determining that the model comprises an urban canyon.

21. The system of claim 20, wherein said modifying the operation of the component of the mobile device further comprises modifying the operation of the component of the mobile computing device to search less frequently for the signal while inside of the urban canyon.

22. The system of claim 20, wherein said modifying the operation of the component of the mobile device further comprises modifying the operation of the component of the mobile computing device to operate circuitry for processing the signal in a low-power mode while inside of the urban canyon.

23. The system of claim 22, wherein the program instructions are further executable by the at least one processor to perform:

determining, based on sensor data, when the urban canyon has been exited, wherein the sensor data is collected from the mobile device; and in response to determining when the urban canyon has been exited, transitioning the circuitry for processing the signal out of the low-power mode.

24. The system of claim 21, wherein the program instructions are further executable by the at least one processor to perform:

determining, based on sensor data, when the urban canyon has been exited, wherein the sensor data is not received from a remote source; and in response to determining when the urban canyon has been exited, searching more frequently for the signal.

* * * * *